(12) United States Patent
White

(10) Patent No.: US 11,508,056 B2
(45) Date of Patent: Nov. 22, 2022

(54) DRONE INSPECTION ANALYTICS FOR ASSET DEFECT DETECTION

(71) Applicant: Measure Global, Inc., Washington, DC (US)

(72) Inventor: Preston White, Bealeton, VA (US)

(73) Assignee: MEASURE GLOBAL, INC., Washington, DC (US)

( * ) Notice: Subject to any disclaimer, the term of this patent is extended or adjusted under 35 U.S.C. 154(b) by 163 days.

(21) Appl. No.: 16/805,138

(22) Filed: Feb. 28, 2020

(65) Prior Publication Data

US 2020/0279367 A1 Sep. 3, 2020

Related U.S. Application Data

(60) Provisional application No. 62/811,966, filed on Feb. 28, 2019.

(51) Int. Cl.
| | |
|---|---|
| *G06T 7/00* | (2017.01) |
| *G05D 1/00* | (2006.01) |
| *G06F 3/04815* | (2022.01) |
| *G06F 16/587* | (2019.01) |
| *G06F 16/583* | (2019.01) |
| *B64C 39/02* | (2006.01) |
| *G06N 3/08* | (2006.01) |

(52) U.S. Cl.
CPC .......... *G06T 7/0008* (2013.01); *B64C 39/024* (2013.01); *G05D 1/0022* (2013.01); *G05D 1/0094* (2013.01); *G06F 3/04815* (2013.01); *G06F 16/583* (2019.01); *G06F 16/587* (2019.01); *G06N 3/08* (2013.01); *B64C 2201/127* (2013.01)

(58) Field of Classification Search
CPC ......... G06T 7/0008; G06T 2207/10016; G06T 2207/10032; G06T 2207/10048; G06T 2207/20084; G06T 2207/30164; G06T 7/0004; B64C 39/024; B64C 2201/127; G05D 1/0022; G05D 1/0094; G05D 1/0038; G06F 3/04815; G06F 16/583; G06F 16/587; G06N 3/08; G06N 3/0454
USPC ...................................................... 382/141
See application file for complete search history.

(56) References Cited

U.S. PATENT DOCUMENTS 6,799,100 B2 * 9/2004 Burns .................. G05D 1/0297
340/436
9,609,288 B1 * 3/2017 Richman ................ H04N 7/185
(Continued)

*Primary Examiner* — Jerome Grant, II
(74) *Attorney, Agent, or Firm* — Brake Hughes Bellermann LLP

(57) ABSTRACT

A set of images of a three-dimensional (3D) inspection object collected by a drone during execution of a first flight path may be received, along with telemetry data from the drone. A tagged set of images may be stored, with each tagged image being stored together with a corresponding drone position at a corresponding time that the tagged image was captured, as obtained from the telemetry data. A mapping of the set of tagged images to corresponding portions of a 3D model of the 3D inspection object may be executed, based on the telemetry data. Based on the mapping, at least one portion of the 3D inspection object omitted from the set of tagged images may be identified. A second flight path may be generated for the drone that specifies a position of the drone to capture an image of the at least one omitted portion of the 3D inspection object.

17 Claims, 23 Drawing Sheets

(56) References Cited

U.S. PATENT DOCUMENTS

| | | | |
|---|---|---|---|
| 9,639,960 B1* | 5/2017 | Loveland | G06T 7/0004 |
| 9,823,658 B1* | 11/2017 | Loveland | G01C 11/02 |
| 9,886,632 B1* | 2/2018 | Loveland | G09B 9/30 |
| 2014/0316616 A1* | 10/2014 | Kugelmass | G06T 11/206 |
| | | | 701/8 |
| 2018/0003161 A1* | 1/2018 | Michini | B64C 39/024 |
| 2018/0003556 A1* | 1/2018 | Uedaira | G01J 1/4228 |
| 2018/0155023 A1* | 6/2018 | Choi | B64C 39/024 |
| 2018/0336409 A1* | 11/2018 | Schultz | G01S 19/39 |
| 2019/0066485 A1* | 2/2019 | Roberts | H04W 4/021 |
| 2020/0279367 A1* | 9/2020 | White | B64C 39/024 |
| 2021/0126582 A1* | 4/2021 | Shue | B64C 39/024 |

* cited by examiner

DRONE INSPECTION ANALYTICS FOR ASSET DEFECT DETECTION

RELATED APPLICATION

This application claims priority to and the benefit of U.S. Provisional Application No. 62/811,966, filed on Feb. 28, 2019, which is incorporated by reference herein in its entirety.

TECHNICAL FIELD

This description relates to drone management and use.

BACKGROUND

Drones are unmanned aerial vehicles that fly by remote control or autonomously, using various combinations of onboard sensors and computing resources. Drones provide many features and advantages that are not available or feasible through the use of manned flights or other competing observational techniques.

In particular, drones provide many advantages in site monitoring and analysis. For example, drones are capable of flying close to sites being monitored, so that onboard cameras may obtain desired images for analysis.

Nonetheless, many challenges and opportunities for improvement exist in the field of drone monitoring. For example, size and weight limitations generally required by drones typically limit available amounts of onboard processing, storage, and data transfer capabilities. In many cases, drones require manual supervision and control when flying. Moreover, many sites to be monitored are remote, difficult to access, and have limited local technical resources (such as network access).

Further, many sites have particular requirements or aspects that can not be suitably monitored using conventional drone software. For example, wind turbines and solar panels may exhibit potential damage in ways that are very different from one another, and from other site objects being monitored.

Thus, drone pilots are often required to travel to a remote site to be monitored, and to make a best effort to collect the specific type of monitoring data that is needed. Upon return to an analysis facility, the drone pilot or other personnel may proceed to transfer and analyze the captured monitoring data. Using conventional techniques, such analysis may be difficult and time-consuming, and may not be optimized for the type of data collected.

Moreover, during such analysis, it may be determined that the captured monitoring data is incorrect or incomplete, or indicative that additional monitoring data is required. Consequently, the drone pilot may be required to re-visit the remote site, perhaps multiple times, to collect additional monitoring data.

SUMMARY

According to general aspects, a computer program product, computer-implemented method, and system are described and claimed. For example, a set of images of a three-dimensional (3D) inspection object collected by a drone during execution of a first flight path may be received, and telemetry data from the drone characterizing drone positions of the drone, during the execution of the first flight path may be received as well. A tagged set of images may be stored, with each tagged image of the tagged set of images being stored together with a corresponding drone position at a corresponding time that the tagged image was captured, as obtained from the telemetry data. A mapping of the set of tagged images to corresponding portions of a 3D model of the 3D inspection object may be executed, based on the telemetry data. Based on the mapping, at least one portion of the 3D inspection object omitted from the set of tagged images may be identified. A second flight path may be generated for the drone that specifies a position of the drone to capture an image of the at least one omitted portion of the 3D inspection object.

The details of one or more implementations are set forth in the accompanying drawings and the description below. Other features will be apparent from the description and drawings, and from the claims.

DETAILED DESCRIPTION

Figure 1:
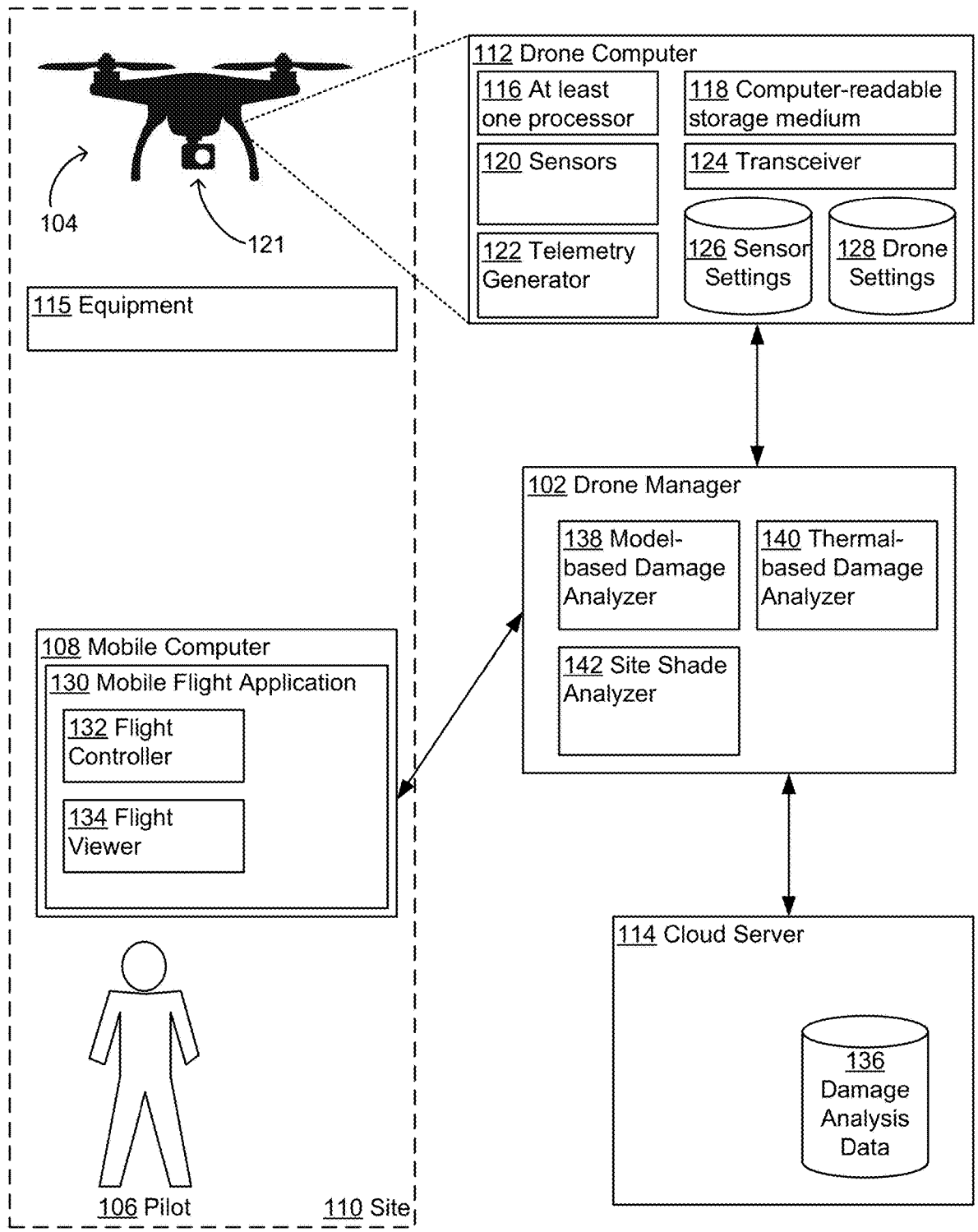
FIG. 1 is a block diagram of a system for drone management and site analysis.

FIG. 1 is a block diagram of a system for drone management and site analysis. In the example of FIG. 1, drone manager 102 represents software and associated hardware for operating and otherwise managing a drone 104 being operated by a pilot 106 at a site 110, using a mobile computer 108. As further illustrated in FIG. 1, and as described in more detail, below, a drone computer 112 generally represents onboard processing and memory resources of the drone 104, while a cloud server 114 represents remote computing resources that may be used in some implementations to provide centralized processing and storage options associated with operating the drone 104.

The drone manager 102 provides a number of features and advantages relevant to providing desired types of inspection of equipment 115 at the site 110. For example, in many of the examples below, the equipment 115 at the site 110 may include a wind turbine farm, or an array of solar panels. In these and similar scenarios, turbines, solar panels, and other examples of the equipment 115 are subject to damage that may result from unavoidable aspects of having equipment installed outdoors. For example, such equipment damage may result from wind, rain, extreme temperatures, or other adverse weather effects, or from birds or other animals. Of course, damage may also occur from the normal wear-and-tear of operating the equipment.

At the same time, the equipment 115 at the site 110 may be extremely difficult to access. For example, a wind turbine farm may include a number of turbines dispersed over a relatively large, remote area. The individual turbines and turbine blades are also large, high, and difficult to access.

Solar arrays also present inspection difficulties. For example, damage to a solar panel may not be visible, or may be difficult to detect visually in an image. Moreover, solar arrays may be installed in areas that also include trees and other foliage. Even if such foliage does not directly damage a solar panel, the foliage may cast shadows that reduce an efficacy of the solar panel, or that prevent accurate inspection for existing damage. Seasonal changes of the foliage, along with corresponding seasonal changes in the sun's position, may also exacerbate a difficulty level of monitoring and inspecting the solar panel array in a consistent or accurate manner.

In general, as referenced above, drones such as the drone 104 provide numerous advantages, many of which mitigate some of the challenges just described to some extent. For example, drones are well-adapted to inspect the types of large, high turbine blades and the large, dispersed solar panel arrays described above.

In addition, the drone manager 102 provides a number of additional solutions to the above and related challenges of performing drone monitoring. For example, when using the drone 104 to monitor and inspect a wind turbine, it may be difficult to confirm with a high degree of confidence that an entirety of the wind turbine has been sufficiently inspected. For example, despite best efforts of the pilot 106, the drone 104 may fail to fly in a vicinity of, or otherwise capture images of, one or more portions of a particular blade(s) of the wind turbine. Similar comments apply to confirming a full inspection of an entirety of a solar panel array, or other examples of the equipment 115. Further, even when sufficient images are captured, some of the images may not have sufficient image quality to complete desired analyses.

In conventional scenarios, such incomplete capture may not be detected, or may only be detected at a later time, e.g., during post-processing of captured data. Consequently, conventional solutions may be unable to provide full or timely analysis of inspected equipment. Additionally, the pilot 106 may be forced to travel back to the site 110 and re-attempt capture of all equipment portions to be inspected.

In contrast, as described in detail, below, the drone manager 102 may be configured to verify full and complete capture of images or other data characterizing desired portions of the equipment 115. Following a first deployment of the drone 104, if such full and complete capture is not verified at the site 110, the drone 104 may be immediately re-deployed by the pilot 106, while the pilot 106 is still present at the site 110.

Moreover, the drone manager 102 is configured to specifically identify equipment portions that were not adequately captured or characterized during the first deployment of the drone 104. Accordingly, during the follow-on second deployment, the drone 104 may be deployed specifically or only to those equipment portions that were determined to require further inspection. In some scenarios, the first deployment may capture inspection data with a relatively low level of data quality (e.g., low resolution images), in order to speed data capture and processing. Such inspection data may be sufficient to identify equipment portions with potential damage. Then, during the second deployment, as just referenced, the drone 104 may be deployed specifically to those equipment portions, and may capture a relatively higher level of quality of data (e.g., high resolution images).

Further, in the context of solar panel arrays and other scenarios in which site shade may be an issue at the site 110, the drone manager 102 may provide site shade analysis that facilitates convenient and complete collection of inspection data. For example, the site 110 may be required to be inspected monthly, or quarterly. During any inspection, a current time of day and season of the year may be related to a digital surface model of the site 110/equipment 115 in order to predict shadow coverage at a time of the current inspection. Thus, the drone manager 102 may be configured to predict site shade and/or associated foliage coverage for a time of each scheduled inspection. Consequently, flight plans, flight schedules, and associated inspection parameters may be adjusted accordingly.

In various ones of the scenarios just described, the drone manager 102 may also be configured to implement various artificial intelligence (AI) techniques, including supervised or unsupervised machine learning (ML), e.g., convolutional neural networks (CNNs), to facilitate the inspection techniques referenced above. For example, when performing image-based inspection, such CNNs may be used to automatically identify, characterize, and/or quantify damage, or types of damage. Such an ability to quickly process large amounts of image data, or other inspection data, and identify areas of damage, provides a dramatic advantage in ensuring complete collection of desired inspection data in an efficient manner, including accurate identification of equipment portions to be re-inspected during a second deployment of the drone 104 while the pilot 106 is at the site 110.

In FIG. 1, the drone 104 may be understood to represent virtually any unmanned aerial vehicle that may be deployed in a manner that is suitable for a given example of the site 110. For example, conditions at the site 110 may necessitate corresponding features at the drone 104, such as stability features when the site 110 is relatively windy. The drone 104 may fly using any suitable or available techniques, such as rotors, propeller(s), or wings. Further, the drone 104 may include many aspects and features not explicitly illustrated or described herein, such as a suitable power supply.

The drone 104 includes an onboard drone computer 112, which is illustrated as including at least one processor 116 and a non-transitory computer readable storage medium 118. That is, the at least one processor 116 may include one or more processors, perhaps operating in parallel, which are operable to execute instructions stored using the computer-readable storage medium 118. Accordingly, the drone 104 should be understood to provide onboard processing and storage of data, some examples of which are described below.

The drone 104 is further illustrated as including a plurality of sensors 120, which may be mounted to the drone 104 and configured to collect, store, and/or transmit sensor data. In FIG. 1, a specific example of the sensors 120 is illustrated as a camera 121, which may represent one or more types of cameras of varying resolutions. However, the sensors 120 may include and represent many other types of sensors, some of which are described herein. For example, the sensors 120 may include LIDAR, temperature sensors, thermal/infrared sensors, audio sensors, or irradiance sensors.

The drone 104 further includes a telemetry generator 122 that represents hardware and software providing one or more types of telemetry data characterizing flight and other operational aspects of the drone 104. For example, such telemetry data may include GPS data, a current yaw, roll, or pitch of the drone 104, a windspeed of the drone 104, a heading or altitude of the drone 104, and power supply.

In general, telemetry may be used to refer to operational aspects of the drone 104 that are partially or completely generic to, or independent of, a particular mission objective of the drone 104 that is currently being executed. Meanwhile, the sensors 120 may be understood to provide mission-specific data collection regarding the deployment of the drone 104 at the site 110. For example, if the site 110 includes an array of solar panels being inspected, then telemetry data such as a current power supply reading would not be particular to the mission of solar panel inspection, while collection of images of the solar panels obtained from the camera 121 may be a primary mission objective.

Of course, this nomenclature is merely for convenience of description, and it will be appreciated that the different types of telemetry data is captured by corresponding telemetry sensors, and, in general, there may be overlap between the different types of sensor and telemetry data being collected. For example, GPS data characterizing a position of the drone 104 may be collected by a GPS sensor, and may be relevant to both a location of a solar panel being inspected, and to the location and flight status of the drone 104. More generally, it will be appreciated that telemetry data may be used to fly the drone 104 successfully on any mission, and some subset of the telemetry data may also be useful in characterizing and enhancing sensor data used to complete a particular type of mission or mission objective.

In FIG. 1, the drone computer 112 is illustrated as including a transceiver 124, which may be configured to transmit collected sensor and telemetry data, and to receive flight control data for continued operation of the drone 104. In some implementations, the transceiver 124 may transmit and receive sensor data while the drone 104 is flying and continuing to collect sensor data. In other implementations, the drone 104 may temporarily store collected sensor data using the computer-readable storage medium 118, and may transmit the collected, stored sensor data after landing (e.g., to the mobile computer 108 and/or the cloud server 114).

In this regard, the computer-readable storage medium 118 may include both onboard, internal storage, as well as removable storage options, such as an SD (secure digital) memory card, or micro SD card. Therefore, in some implementations, the transceiver 124 may not be required for sensor data collection.

The various sensors 120 may be operated based on sensor settings 126. For example, with respect to the camera 121, the sensor settings 126 may specify a number, type, timing, resolution, and angle of image capture. Similar comments would apply to corresponding operational aspects of other types of sensors being deployed. The sensor settings 126 may be specified prior to takeoff of the drone 104, or may be updated and modified as needed during a flight of the drone 104, using the transceiver 124.

Meanwhile, drone settings 128 generally refer to flight control settings that dictate the flight of the drone 104. For example, as with the sensor settings 126, the drone settings 128 may be pre-set to some degree, and/or may be received in real-time from the mobile computer 108, by way of the transceiver 124.

Specifically, the mobile computer 108 is illustrated as including a mobile flight application 130, which may include a flight controller 132 and a flight viewer 134. The flight controller 132 generally assists in generating a flight plan or path for the drone 104, and/or receives commands from the pilot 106 to be transmitted to the drone computer 112 to control the flight of the drone 104 within a visible distance of the pilot 106 at the site 110. The flight viewer 134 may be configured to provide the pilot 106 with one or more types of views characterizing a current flight of the drone 104, using an appropriate user interface.

In various implementations, the mobile computer 108 may include any smartphone, tablet, notebook, laptop, or other suitable mobile device with sufficient processing and other hardware resources, to execute the mobile flight application 130. In this regard, it will be appreciated that, although not separately illustrated in FIG. 1, the mobile computer 108 will include at least one processor, non-transitory computer readable storage medium, transceiver, and other hardware resources similar to corresponding elements of the drone computer 112. Of course, similar comments apply to the cloud server 114, as well.

In FIG. 1, the drone manager 102 is illustrated separately from, but connected to, the mobile computer 108, the drone computer 112, and the cloud server 114. In various implementations, it will be appreciated that, as referenced above, the drone manager 102 includes various types of software and hardware resources, which may be implemented in the context of corresponding hardware resources of any one or more of the mobile computer 108, the drone computer 112, and/or the cloud server 114.

In general, implementing portions of the drone manager 102 at the drone computer 112 provides a number of advantages. For example, data processing and analysis performed at the drone 104 may be used immediately to direct further operations of the drone 104 and the sensors 120. For example, as described below, images obtained by the camera 121 may be processed by the drone manager 102 at the drone computer 112, and areas at the site 110 determined to exhibit damage or otherwise require further inspection may be immediately re-inspected using the drone 104.

Implementing portions of the drone manager 102 at the mobile computer 108 may provide many of the advantages of operating portions of the drone manager 102 at the drone computer 112. For example, when the pilot 106 is present at the site 110, the pilot 106 may re-deploy the drone 104 upon completion of data processing at the mobile computer 108.

In some scenarios, it is possible that the drone 104 may capture relatively large amounts of data at the site 110, or the captured data may require extensive processing, or the type of processing required may not be fully defined at a time of deployment of the drone 104. Thus, it may not be feasible for certain types of data analysis to be performed using the drone computer 112 or the mobile computer 108 at the site 110 during the deployment of the drone 104. For example, the drone 104 generally has a limited power supply, and the pilot 106 may have a limited amount of time to be present at the site 110. In these and other scenarios, some of which are described below, the cloud server 114 may be best-suited for implementing corresponding portions of the drone manager 102.

The drone manager 102 is illustrated in FIG. 1 as including a model-based damage analyzer 138, a thermal-based damage analyzer 140, and a site shade analyzer 142. Although shown in FIG. 1 as separate, individual modules that may be implemented at one or more of the drone computer 112, the mobile computer 108, and the cloud server 114, it will be appreciated from the present description that any one of the modules 138, 140, 142 may be implemented using two or more sub-modules, where such submodules may also be distributed in a desired manner among the drone computer 112, the mobile computer 108, and the cloud server 114.

For example, example implementations of the model-based damage analyzer 138 are illustrated and described with respect to FIGS. 2-9. Example implementations of the thermal-based damage analyzer 140 are illustrated and described with respect to FIGS. 10-15. Example implementations of the site shade analyzer 142 are illustrated and described with respect to FIGS. 16-23.

In general, the model-based damage analyzer 138 is configured to provide complete, accurate damage analysis in a manner that is fast and convenient for the pilot 106, in scenarios in which the equipment 115 includes multi-sided, vertical structures that require a 3-dimensional (3D) flight plan. For example, the equipment 115 may include a wind turbine farm, and the drone 104 may be required to move in 3 dimensions as part of a flight plan to capture all sides and heights of each turbine blade and other turbine structures.

As described in detail with respect to FIGS. 2-9, the model-based damage analyzer 138 may be configured to construct and utilize a 3D model of each turbine in conjunction with a corresponding 3D flight plan. During a first deployment of the drone 104 at the site 110, sensor data and telemetry data may be captured. The model-based damage analyzer 138 may be further configured to sort, filter, or otherwise evaluate the sensor data and telemetry data, including captures images from the camera 121, and map the resulting image data to the 3D model. In this way, it is possible for the pilot 106 to determine whether sufficient (or sufficient quality) images of each turbine have been captured.

If necessary, the pilot 106 may proceed to a second deployment of the drone 104. During the second deployment, the pilot 106 may automatically or manually direct the drone 104 to specific points at each turbine at which further (or better) data is required. In this way, the pilot 106 may be assured that a full data set of sufficient quality has been obtained, during a single trip to the site 110.

Meanwhile, the thermal-based damage analyzer 140 may be suited for use when the equipment 115 includes solar panels, or other equipment for which potential damage may be indicated by a local temperature that exceeds a predetermined threshold. In the present description, such a threshold is referred to herein as an isotherm.

During operation, the pilot 106 executes a first deployment of the drone 104 at a relatively high altitude relative to the, e.g., solar panels. The drone 104 is deployed with one of the sensors 120 including a thermal detector, e.g., an infrared sensor. The collected images from the first deployment may be relatively low-resolution. Nonetheless, the thermal-based damage analyzer 140 may be configured to analyze the collected data and identify "hotspots" on the solar panels at which the isotherm is exceeded. Telemetry or other sensor data may be captured together with the collected data during the first deployment, and used to log and tag each location of each hotspot as a waypoint.

Then, the pilot 106 may execute a second deployment of the drone 104, during which the drone 104 is directed specifically to the waypoint locations of the isotherms. The second deployment may be executed at a lower altitude, during which high resolution images are captured of each previously-identified hotspot, using, e.g., the camera 121.

By executing the first deployment at a relatively high altitude and requiring relatively low-resolution data, the first deployment may be performed quickly, using a relatively small amount of power, processing, and memory resources. By executing the second deployment at a relatively lower altitude and using high resolution data only for the previously-identified hotspots (as compared to for the site 110/equipment 115 as a whole), drone power/processing/memory resources may again be conserved, while still ensuring that any damage present on the solar panels is identified.

Both the model-based damage analyzer 138 and the thermal-based damage analyzer 140 may execute one or more implementations of a damage classifier. For example, such damage classifiers may utilize a convolutional neural network (CNN) or other type of neural network, or artificial intelligence/machine learning, to classify a type and extent of damage captured by the analyzers 138, 140.

For example, such a CNN may be trained using a set of training data, and configured to classify specific types and extents of damage that may be particular to the type of equipment 115 being inspected. For example, when the equipment 115 includes a turbine, types of damage may be classified as grease, cracking, or erosion, and quantified in terms of severity using a scale of 1-10, or other suitable scale.

In example implementations, such damage classification may be used during or after a first deployment of the drone 104, and/or during or after a second deployment of the drone 104. For example, damage classification may be used during a first deployment of the drone 104 to detect, classify, and quantify damage observed at a specific turbine, so that the second deployment of the drone 104 may be directed specifically to the site of the classified damage. In other examples, such damage classification may occur following the second deployment of the drone 104, e.g., during post-processing that may occur at the cloud server 114. The drone 104 need not be landed/re-launched in between the two or more deployments.

Finally in FIG. 1, the drone manager 102 is illustrated as including a site shade analyzer 142. As shown and described with respect to FIGS. 16-23, the site shade analyzer 142 may be configured to collect, provide, and predict shade data at the site 110. As a result, for example, corrective measures may be taken at the site 110, and/or with the drone 104.

For example, the site shade analyzer 142 may be configured to collect and analyze image data collected by the drone 104 at the site 110, during one or more deployments of the drone 104. The site shade analyzer 142 may be further configured to classify portions of collected imagery as potential shade-causing elements, such as, e.g., trees, buildings, or portions of the equipment 115.

Subsequently, the site shade analyzer 142 may be configured to utilize data characterizing solar positions at the site 110 over a predefined time period, such as a day, week, month, or season of the year, and predict a location and extent of shade that is predicted to occur at a future point in time (or at a current point in time, without having to visit the site 110 at that time). Further, the site shade analyzer 142 may provide a visual, graphical user interface (GUI) that illustrates the predicted shade at the site 110. For example, such a GUI may allow a user to designate a specific time (e.g., day), and be provided with a visual illustration of predicted shade on that day at the site 110.

Shade may be particularly relevant and important when the equipment 115 includes solar panels, because shade that is cast on a solar panel will impair a performance and efficiency of the solar panel. The site shade analyzer 142 may be configured to classify the equipment 115 as including solar panels, and may be configured to provide the GUI with an identification of areas of the solar panels that are predicted to be obscured by shade.

In still further examples, the site shade analyzer 142 may be configured to consider scenarios in which the site 110 includes trees or other foliage, including predicting future growth or forestation of the trees at designated times. For example, a tree that is fully foliated in the summer will consume a larger volume and cast a larger or different shadow than the same tree when defoliated in the winter. The site shade analyzer 142 may be configured to provide the GUI with visual illustrations of such differences, taking into account corresponding seasonal differences in the angle of the sun.

Through the use of these and other features, the site shade analyzer 142 may be configured to provide numerous advantages, some of which are described herein. For example, by predicting shade coverage at a future date, corrective measures may be taken in the present, such as trimming or removing trees. Corrective measures may also include, e.g., installing or relocating solar panels within areas that are not covered by shade. As referenced herein, such site shade analysis may also be used to schedule drone inspections, e.g., to ensure optimal data collection.

Figure 2:
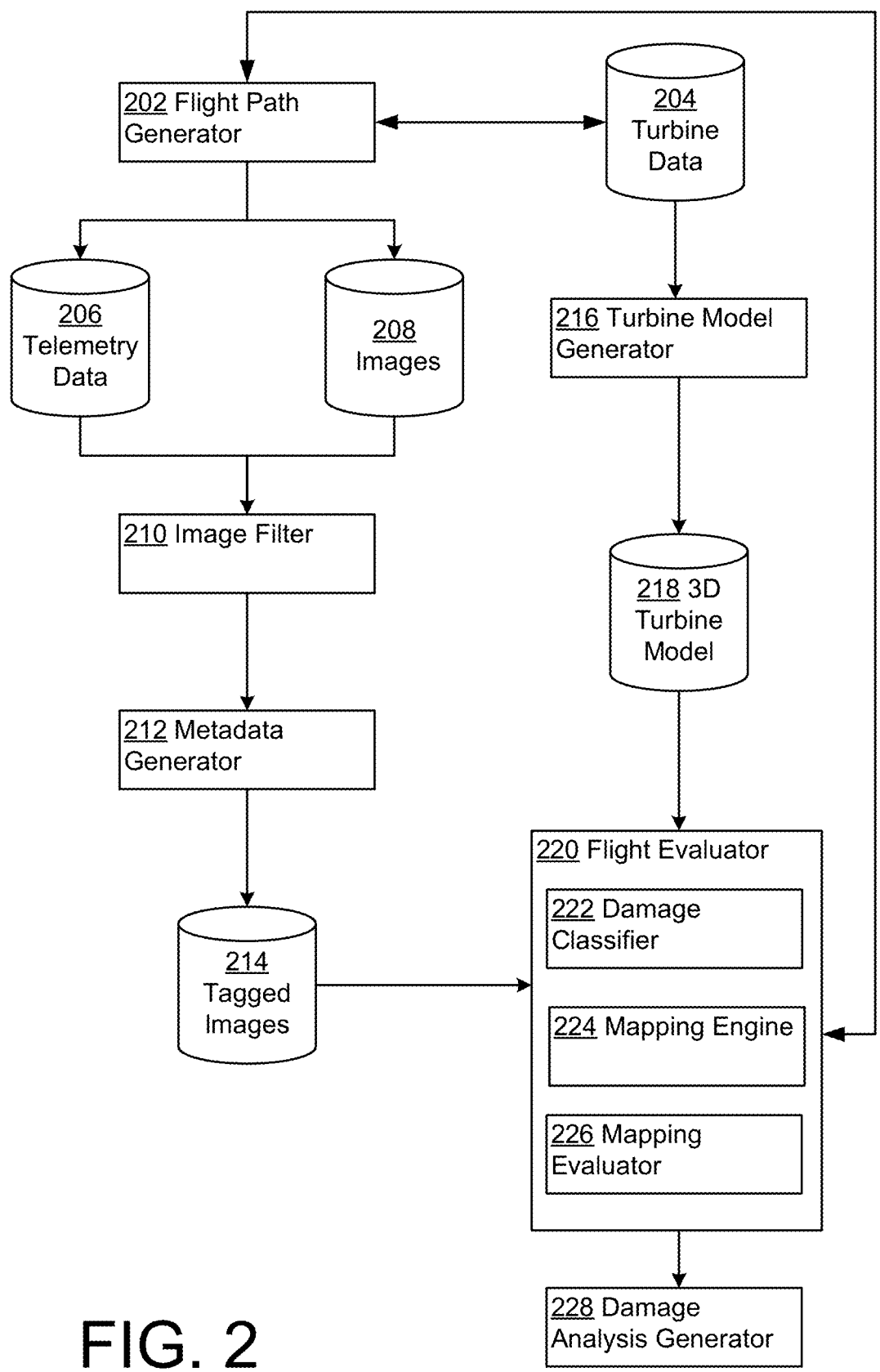
FIG. 2 is a block diagram of an example implementation of a model-based damage analyzer of FIG. 1.

FIG. 2 is a block diagram illustrating more detailed example implementations of the model-based damage analyzer 138 of FIG. 1. In the example of FIG. 2, the equipment 115 of FIG. 1 should be understood to represent a 3D structure, such as a wind turbine, a building, a bridge, or any other 3D structure for which damage analysis may be performed using data collected by the drone 104. Thus, in the following examples described with respect to FIGS. 2-9, the equipment 115 is primarily described and illustrated as representing wind turbines and associated structures and aspects thereof, and such examples should be understood to be illustrative and non-limiting of the concepts described herein, and included merely for the sake of example and explanation.

As may be appreciated from the above description of FIG. 1, the flight path generator 202 may be implemented partially or completely using the mobile flight application 130, or may be implemented partially or completely at the drone computer 112. In some example implementations, the flight path generator 202 may generate a static flight path to be implemented by the pilot 106. For example, as described and illustrated below, turbine data 204 may be available, and may include descriptive information characterizing various makes, models, or types of turbines. The flight path generator 202 may utilize an appropriate subset of the turbine data 204 to specify a flight path to the pilot 106.

For example, for a specific turbine to be inspected, the flight path generator 202 may generate a flight path specifying a starting position and number of turbine blades of the turbine, and other relevant structural details. The flight path may specify an order in which the blades of the turbine will be inspected. The flight path may further specify a starting point, ending point, and various intermediate points for each individual turbine blade. Further flight characteristics, such as a distance of the drone 104 from each turbine blade (e.g., at a time of image capture), may further be specified.

In some implementations, such as when the flight path generator 202 is implemented primarily or exclusively using mobile flight application 130, the pilot 106 may be provided with the generated static flight path, and may proceed to utilize the flight controller 132 to deploy the drone 104 and execute the generated static flight path.

In other example implementations, the flight path generator 202 may generate a partially or completely dynamic flight path. Such dynamic flight paths generally include, or rely on, feedback obtained during the flight of the drone 104 to execute and implement further portions of the dynamic flight path. For example, the flight path generator 202 may obtain such feedback from the sensors 120, including the camera 121, during a flight of the drone 104. The captured feedback may be provided using the mobile flight application 130, e.g., by way of the flight viewer 134. In example implementations, the pilot 106 may utilize the provided feedback to adjust or otherwise implement a subsequent portion of the dynamic flight path.

In other example implementations, the generated flight path may be even more dynamic, and may require less input from the pilot 106 to complete the desired turbine inspection. For example, the flight path generator 202 may have access to turbine data 204, and may specify a starting point on a turbine to be inspected. Once the pilot 106 has deployed the drone 104 to the specified starting point, the flight path generator 202 may proceed to execute the predetermined, dynamic flight path, including using received sensor data to determine that a specified portion of the turbine has been inspected, and utilizing such feedback in combination with the turbine data 204 to direct the drone 104 to a subsequent portion of the turbine to be inspected.

For example, as referenced above, and described in more detail below, the flight path generator 202 may utilize artificial intelligence, such as a trained convolutional neural network, to recognize and classify a current portion of a turbine being inspected. The thus-classified portion, along with corresponding or relevant subsets of the turbine data 204, may be used to predict and control a subsequent movement of a drone 104. In such example implementations in which a dynamic flight path is utilized, the flight path generator 202 may be partially, primarily, or exclusively implemented at the drone computer 112, so that the drone 104 may operate autonomously once positioned at the designated starting point by the pilot 106.

During the flight of the drone 104 along the generated flight path, and as referenced above with respect to FIG. 1, telemetry data 206 and images 208 (and/or other sensor data) are captured. As may be appreciated from the above description, the telemetry data 206 may include, e.g., a position, orientation, speed, or virtually any other desired or available characteristic of the drone 104 during its inspection flight. Meanwhile, the images 208 represent images of the turbine being inspected, as captured by the camera 121.

In some implementations, the images 208 may be captured as individual, discrete images. That is, for example, the flight path generated by the flight path generator 202 and/or executed by the pilot 106 may include discrete positions at which individual images are captured by the pilot 106, or automatically by the model-based damage analyzer 138. That is, for example, the drone 104 may be flown to a first position, and used to capture a first image, and then to a second position, at which a second image is captured.

In practice, a field of view of the camera 121, a distance of the drone 104 from the turbine, and various other factors may be utilized to specify and define drone positions at which each image of the images 208 is captured, with a goal of obtaining full or desired coverage of the turbine being inspected. In other words, for example, assuming that an entirety of the turbine being inspected is intended to be captured in corresponding images, the generated and implemented flight path is executed with the intention and goal of capturing a sufficient number and quality of corresponding images, so as to thereby ensure execution of a complete and accurate damage analysis with respect to the turbine being inspected.

An image filter 210 may be configured to remove images from the images 208 that are not suitable for use in further calculations. For example, the image filter 210 may detect any images with corrupt data. The image filter 210 may detect image data that was captured inadvertently or erroneously by the pilot 106, such as when the pilot 106 captures video of the turbine, rather than discrete, still images. In other examples, however, video may be kept and used for later damage analysis.

The image filter 210 may utilize the telemetry data 206 to filter the images 208. For example, the image filter 210 may determine from the telemetry data 206 that the drone 104 was moving, or moving too quickly, during a capture of a specific image of the images 208. In other examples, the image filter 210 may determine that an angle or other characteristic of the camera 121 was incorrect during capture of one or more corresponding images.

In other example implementations, the image filter 210 may be configured to execute various types of computer vision analysis, in order to examine a quality or other characteristic of each image of the images 208. For example, images determined to be sufficiently blurry may be filtered.

Following the above and related operations of the image filter 210, a metadata generator 212 may be configured to generate a set of tagged images 214, as shown. Specifically, the metadata generator 212 may determine, for each image received from the image filter 210, corresponding telemetry data from the telemetry data 206. Then, the metadata generator 212 may be configured to generate a file for each such image, in which the image and its corresponding telemetry data are included.

Further in FIG. 2, the turbine data 204 may be utilized by a turbine model generator 216 to generate a 3D turbine model 218. Example implementations of the turbine model generator 216 and the 3D turbine model 218 are illustrated and described below. In general, in some implementations, the turbine model generator 216 may utilize known, existing, or standard descriptions of a particular turbine to be inspected, such as may be provided by a manufacturer of the turbine.

Additionally, or alternatively, the drone 104 may be utilized by the pilot 106 to collect imagery and associated telemetry data needed to generate the 3D turbine model 218. For example, when inspecting a plurality of turbines, the pilot 106 may initially execute a more detailed or more specialized flight path with respect to a first turbine being inspected, in order to be able to generate the 3D turbine model 218. Thereafter, the 3D turbine model 218 may be utilized with respect to remaining turbines to be inspected.

A flight evaluator 220 may be configured to evaluate results of the flight of the drone 104 with respect to the turbine being inspected, using one or both of the tagged images 214 and the 3D turbine model 218. For example, the flight evaluator 220 may include a damage classifier 222. The damage classifier 222, as referenced above, may be configured to implement a CNN to classify damage to the turbine that may be observed within the tagged images 214. For example, the damage classifier 222 may be configured to classify, with respect to a given tagged image, an inclusion of briefs, cracking, or erosion. The damage classifier 222 may also include a metric characterizing a severity of the classified damage, and/or a confidence level of the obtained classification/severity.

A mapping engine 224 may be configured to map the tagged images 214 to corresponding positions of the 3D turbine model 218. For example, a given tagged image of the tagged images 214 may be associated with a defined position and surface area of the turbine being inspected. The mapping engine 224 may be configured to map the position and surface area to corresponding portions of the 3D turbine model 218.

A mapping evaluator 226 may be configured to evaluate results of the mapping engine 224. For example, the mapping evaluator 226 may be configured to evaluate a type and/or extent of coverage of the 3D turbine model 218 provided by the tagged images 214. Thus, the mapping evaluator 226 may be configured to identify any portions of the turbine being inspected that require further or additional inspection. For example, the mapping evaluator 226 may identify a portion of the turbine that was not captured or included within the tagged images 214.

For example, it may occur that a particular portion of the turbine was captured within the images 208, but removed by the image filter 210 (e.g., for being of insufficient quality), and therefore not included within the tagged images 214. In other scenarios, it may occur that the pilot 106 mistakenly or inadvertently failed to capture a particular portion of the turbine being inspected.

Additionally, the mapping evaluator 226 may evaluate results obtained from the damage classifier 222, as part of the mapping evaluation. For example, the mapping evaluator 226 may determine that an image of the tagged images 214 includes potential damage that requires further inspection for complete damage analysis to be completed. For example, such further inspection may include closer or higher resolution images, and/or other types of collected sensor data.

As shown in FIG. 2, the flight evaluator 220 may utilize aspects of the originally-generated flight path provided by the flight path generator 202. For example, as referenced above, the generated flight path may include a designated order of turbine blades of the turbine being inspected. Thus, the mapping engine 224 may utilize this blade order to sort, classify, or otherwise map individual ones of the tagged images 214, e.g., with respect to the 3D turbine model.

Conversely, the flight evaluator 220 may also be configured to provide evaluated mapping results to the flight path generator 202, to thereby enable the flight path generator 202 to generate an updated flight path. For example, when the mapping evaluator 226 identifies a portion of the turbine being inspected that requires further inspection, the flight evaluator 220 may provide positional information to the flight path generator 202, so that the updated flight path includes only the one or more portions of the turbine that were not included within the tagged images 214.

Thus, following a second deployment of the drone 104, and a corresponding second iteration of the above-described operations of the system of FIG. 2, the mapping evaluator 226 may determine that the inspected turbine has been completely inspected, and no further deployments of the drone 104 are required. A damage analysis generator 228 may be configured to proceed with performing damage analysis for the inspected turbine. For example, damage analysis performed by the damage analysis generator 228 may be performed at the cloud server 114, at which greater computing resources are available. Consequently, the damage analysis may include more detailed automated processing, as well as manual inspections of the identified damage within the tagged images 214.

In summary, FIG. 2 illustrates a system configured to generate a 3D model for any suitable 3D inspection object to be inspected by the drone 104. As described, in addition to the example of the turbine provided herein, such 3D inspection objects may include buildings, bridges, or virtually any other 3D object suitable for inspection by the drone 104.

As also described, a set of tagged images of the 3D inspection object collected by the drone may be received, with each tagged image being stored together with telemetry data characterizing a position of the drone at a time the corresponding tagged image was obtained by a camera mounted on the drone. For example, as described above, the tagged images 214 may be labelled by the metadata generator 212, using corresponding portions of the telemetry data 206.

A mapping of the set of tagged images to corresponding positions of 3D model may be executed, based on the telemetry data. That is, as described, the mapping engine 224 may be configured to map the tagged images 214, using the associated metadata, to corresponding portions of the 3D turbine model 218, in the example of FIG. 2.

Based on the mapping, at least one portion of the 3D inspection object omitted from the set of tagged images may be identified. For example, the mapping evaluator 226 may identify a portion of the inspected turbine or other inspection object that was inadvertently omitted by the pilot 106, or may identify portions that were filtered by the image filter 210.

Consequently, if needed, an updated flight path may be generated, so as to execute a drone flight to capture an image of the at least one omitted portion. As described, the above-referenced methodologies may enable the pilot 106 to obtain complete coverage of an inspected turbine or other inspection object, during a single excursion to the site 110. Moreover, the pilot 106 and other users are provided with insurance that entirety of the turbine has been inspected, so that potential damage is not inadvertently missed.

Figure 3:
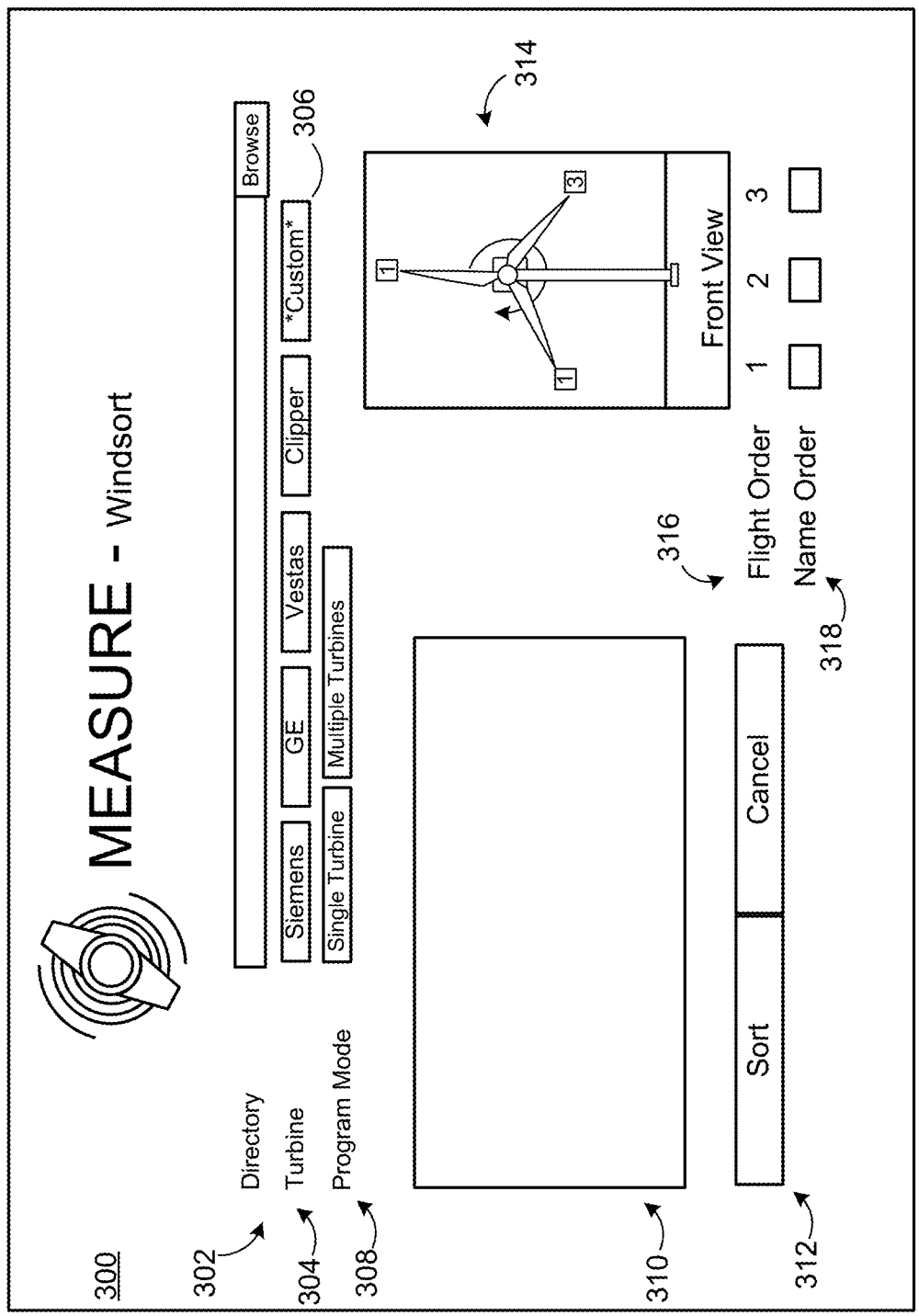
FIG. 3 is a first example screenshot used by the model-based damage analyzer of FIGS. 1 and 2.

FIG. 3 is a screenshot 300 of an example GUI that may be used in the mobile flight application 130 of FIG. 1. For example, the screenshot 300 illustrates an example GUI that may be utilized to validate a flight path and associated data collection of the drone 104 for one or more turbines to be inspected. The GUI of FIG. 3, or related GUI(s), also may be used to review damage analysis data collected by the drone 104, at various stages of operation of the system of FIG. 2.

In the example of FIG. 3, a directory field 302 enables a user, such as the pilot 106, to browse and review the various types of data that may be stored during execution of processes of the system of FIG. 2. For example, in association with a suitable flight path for the drone 104, the directory field 302 may be utilized to identify and review relevant portions of the turbine data 204 of FIG. 2. Once available, the tagged images 214 and the 3D turbine model 318 may also be reviewed by way of the directory field 302. Further, preliminary, previous, or current damage classification and analysis results may be selected and viewed.

A turbine field 304 is illustrated that includes a plurality of buttons or other icons for indicating individual turbine types. For example, in FIG. 3, various makes/models of turbines are selectable. As may be appreciated from the above description of FIG. 2, selection of a particular turbine or type of turbine may provide access to pre-generated turbine data. For example, the pilot 106 or other user may select a a pre-generated 3D turbine model.

In FIG. 3, and also as referenced above, a custom button 306 may provide the pilot 106 or other user with ability to characterize a customized flight path and/or 3D turbine model, such as when the turbine being inspected is not associated with a previously-inspected type of turbine. In such scenarios, the created, customized turbine data may be collected and otherwise generated by the pilot 106, and stored for future selection and use.

A program mode field 308 is illustrated as enabling the pilot 106 or other user to select between a single turbine or multiple turbines. More generally, it will be appreciated that the program mode field 308 enables selection and review of aspects of a generated flight path and other characteristics of an inspected turbine.

Further in FIG. 3, dialog box 310 may be configured to display outputs or errors. Button 312 initiates sorting and/or mapping processes for executing mappings of turbine images to their respective portions of their corresponding turbine(s) as described herein, taking into account relevant information related to the flight path, image metadata, turbine model, and directory. In some implementations, the individual images may be assigned to corresponding folders created for each portion (e.g., each blade, or blade side) of each turbine that is being mapped.

Turbine diagram 314 illustrates a manner in which a blade(s) has been rotated, and provides numbering reference for each blade. Boxes 316 (flight order) and 318 (name order) allows the pilot 106 to input an order in which the blades were flown, or will automatically fill and provide a data check to ensure that data will be organized into its respective directory/folder structure.

Figure 4:
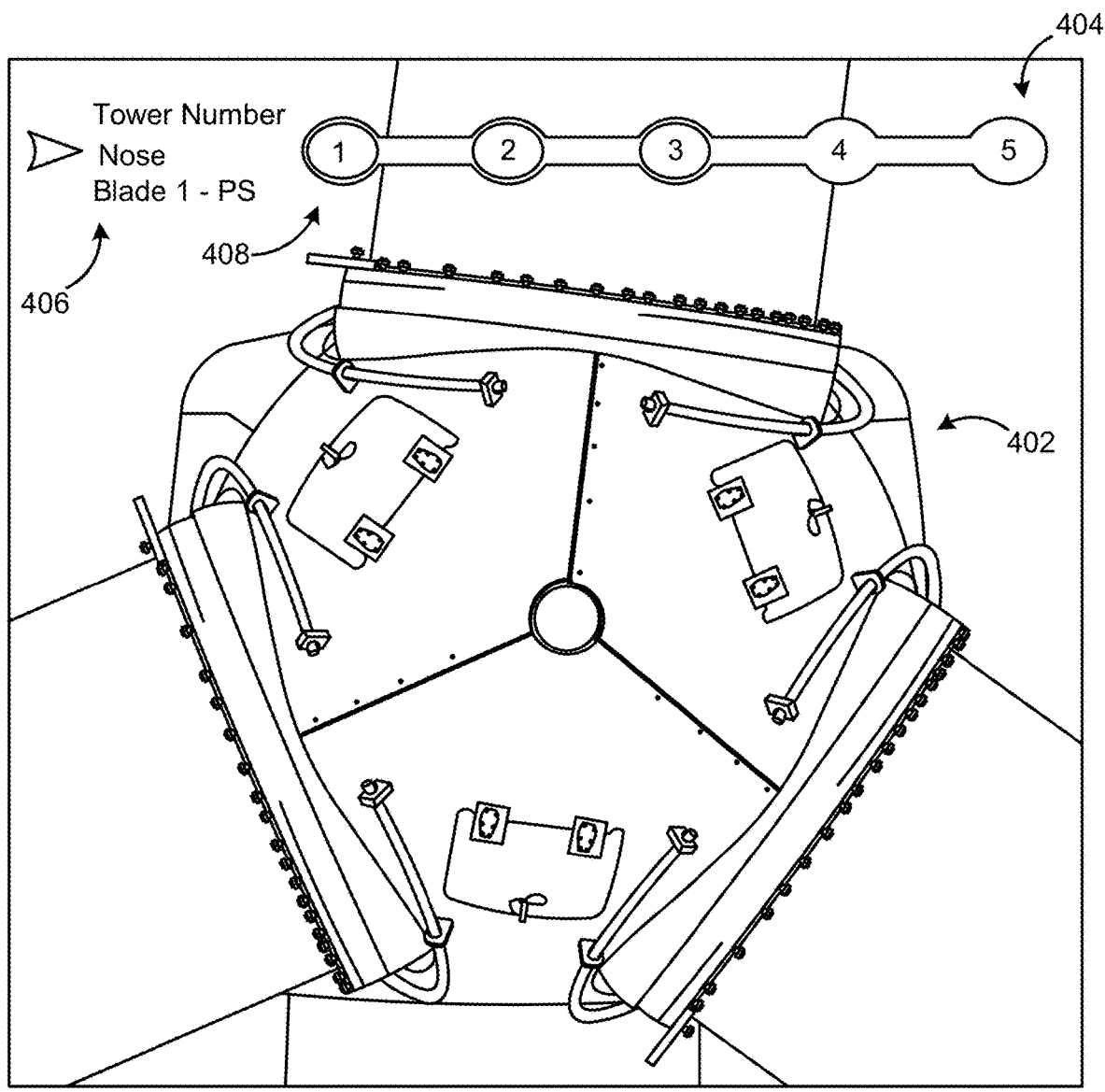
FIG. 4 is a second example screenshot used by the model-based damage analyzer of FIGS. 1 and 2.

FIG. 4 is a screenshot 400 illustrating a further example implementation of a GUI of the model flight application 130 of FIG. 1. In the example of FIG. 4, it is assumed that a suitable flight path for the drone 104 has previously been generated, using the techniques described above with respect to FIGS. 1-3.

Then, as shown in FIG. 4, the pilot 106 is provided with an image 402 from the camera 121 of the drone 104. For example, the image 402 may represent a current view or image of the camera 121, as the pilot 106 operates the drone 104 to execute the previously-determined flight path. Then, as shown, a flight path representation 404 may be superimposed on the image 402, in order to facilitate execution of the predetermined flight path by the pilot 106.

As shown, the flight path progress illustration 404 may include a list 406 of ordered turbine elements, including a highlighted element "nose" indicating that the current image 402 corresponds to a nose of the turbine being inspected. Meanwhile, a progress bar 408 provides an illustration of ordered sub paths of the predetermined flight path. As shown, sub paths that have been completed may be visually distinguished from individual sub paths that have not yet been completed (e.g., elements "1," "2," and "3" are highlighted, while elements "4" and "5" are not).

Using the screenshots of FIGS. 3 and 4, the pilot 106 may easily and thoroughly navigate the turbine being inspected, in accordance with the predetermined flight path. For example, the pilot 106 may initially position the drone 104 at a predesignated starting point of the turbine being inspected, with the assumption and understanding that the ordered blades of the turbine being inspected have been positioned in a manner that corresponds to the flight path being implemented, as described above with respect to 314-318 of FIG. 3. Using the flight path progress illustration 404, the pilot 106 may then proceed to navigate the drone 104 and capture images of each designated turbine portion.

As the pilot 106 indicates capture of specific images, the flight path progress illustration 404 may be updated accordingly. In some example implementations, the pilot 106 may initially complete a first deployment of the drone 104 in attempting to collect sufficient image data for the turbine being inspected. Thereafter, the techniques of FIG. 2 may be utilized to evaluate the captured imagery, and, if necessary, may designate and identify specific portions of the turbine being inspected that require collection of further imagery, as described above with respect to FIG. 2. In such cases, as already described with respect to FIG. 2, an updated flight path may be generated, including only the identified portions of the turbine being inspected. Of course, in such scenarios, the flight path illustration 404 may be updated accordingly, as well.

In other example implementations, the flight path progress illustration 404 may be dynamically updated in real-time, even before the pilot 106 has completed an entire collection process for the turbine being inspected. For example, the pilot 106 may attempt to collect imagery for an entirety of a first turbine blade of the turbine being inspected, whereupon a corresponding portion of the flight path progress illustration 404 may be updated to illustrate the completion of image collection for the blade in question. As the pilot 106 progresses to image collection for the second turbine blade, the processes and techniques of FIG. 2 may be implemented in the background. If the flight evaluator 220 determines that the imagery collected for the first turbine blade is, in fact, insufficient or incomplete, then the corresponding portion of the flight path progress illustration 404 may be reset to its original condition, to indicate that further image collection is required with respect to the first turbine blade.

In such implementations, the pilot 106 may proceed to capture, or recapture, some or all required images for the first turbine blade. In particular, it will be appreciated that the pilot 106 is not required to return to the site 110 to collect such further imagery, and, in the example implementations, is not even required to complete a first full deployment of the drone 104 before returning to a site of incomplete or insufficient image data.

Figure 5:
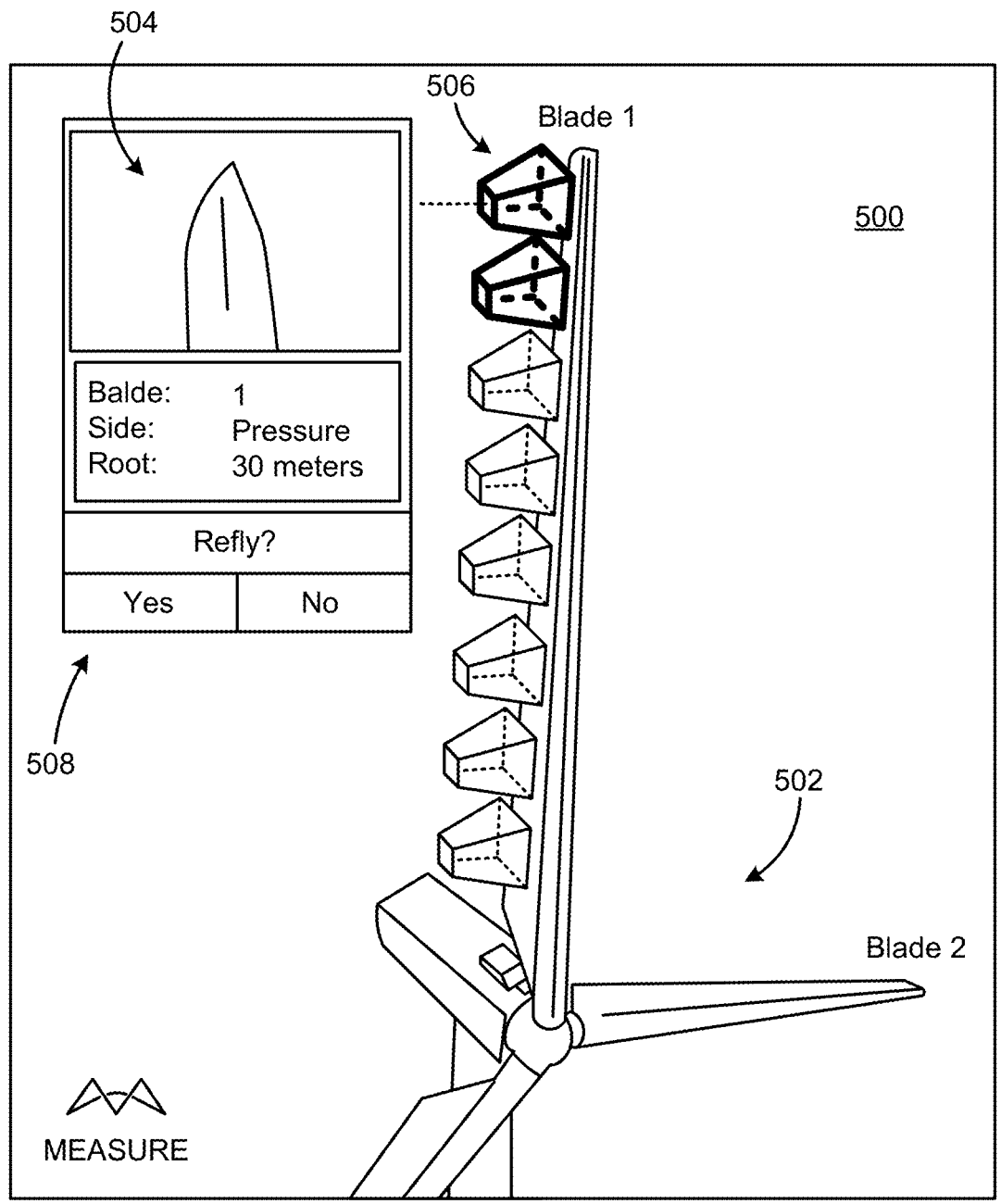
FIG. 5 is a third example screenshot used by the model-based damage analyzer of FIGS. 1 and 2.

FIG. 5 illustrates a 3D model that may be used in the example implementations of FIGS. 1-4. In the example of FIG. 5, a 3D model 502 of a turbine is illustrated.

As shown, an image 504 of the modeled turbine is mapped to the 3D model 502. Specifically, the location and orientation of the image 504 is projected into the 3D environment of the 3D model 502.

As also shown in FIG. 5, a 3D inspection element 506 defines and illustrates a coverage area on the modeled turbine that is captured by the camera 121 when obtaining the image 504. As referenced above, the inspection element 506 may be sized and otherwise defined based on a position of the camera 121 at a time of capture of the image 504, and in relation to a corresponding portion of the 3D model 502.

As also described above, a number of potential circumstances exist as to why the image 504 may be insufficient or inadequate in representing or capturing the portion of the modeled turbine represented by the inspection element 506. For example, the image 504 may be of insufficient quality. In other examples, the image 504 may provide an initial or preliminary indication of damage detection, which may necessitate further or better image capture with respect to the portion of the model turbine represented by the inspection element 506. Of course, in other example implementations, it may occur that no image corresponding to the inspection element 506 is captured during a droned deployment, such as when the pilot 106 mistakenly or inadvertently fails to execute such a capture, or when captured image data is corrupted.

In these and other scenarios in which further image capture is required, FIG. 5 illustrates that specific turbine areas may be defined with respect to the 3D model 502, and visually identified to the pilot 106. For example, in a scenario in which the image 504 is insufficient, the inspection element 506 may be visually highlighted (e.g., rendered in a different color, or otherwise visually distinguished from other inspection elements), and the pilot 106 may be presented with a selection element 508. As shown, the selection element 508 provides the pilot 106 with an opportunity to re-fly or re-inspect the portion of the modeled turbine corresponding to the image 504.

Figure 6:
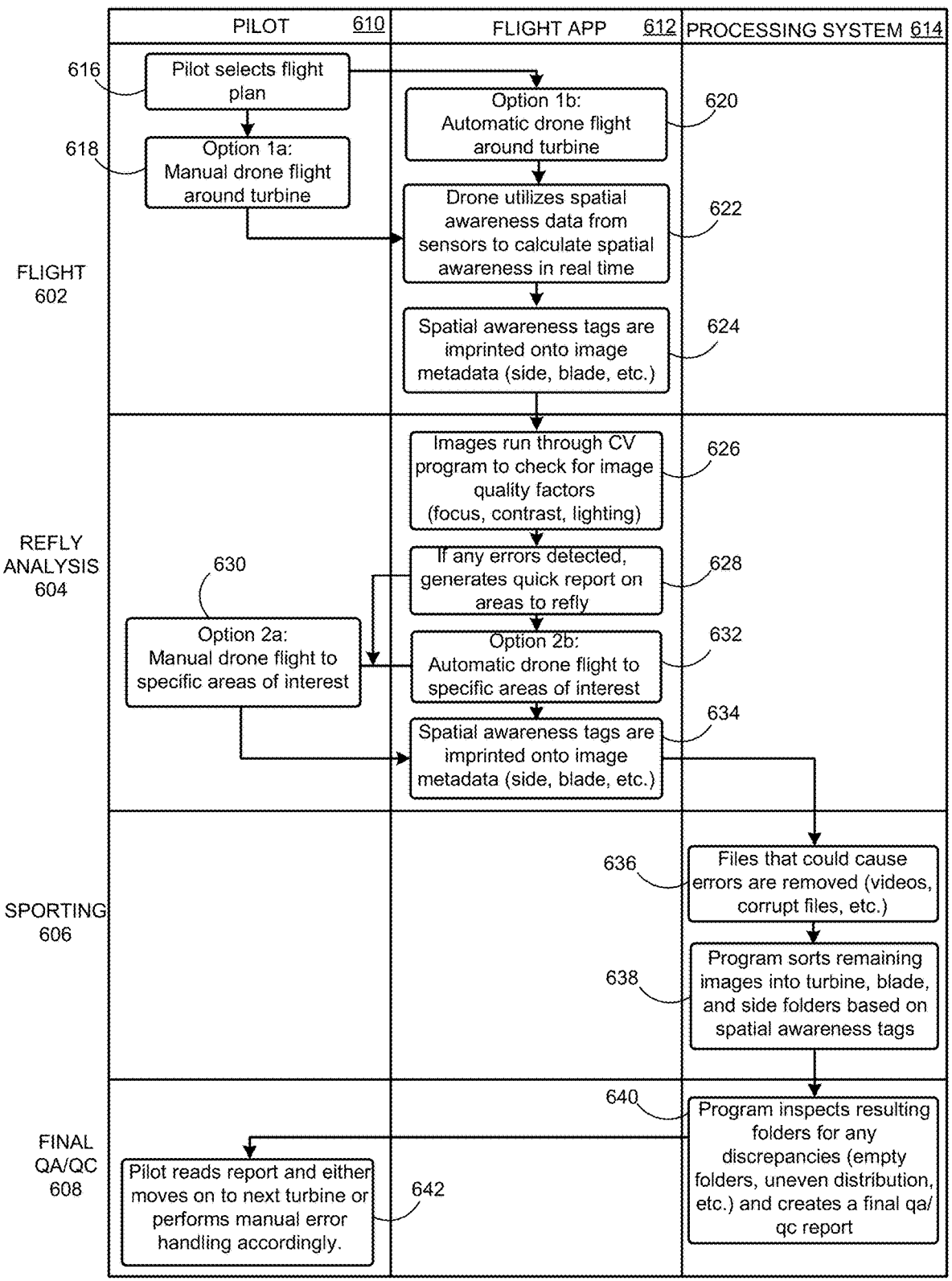
FIG. 6 is a flowchart illustrating example operations of the model-based damage analyzer of FIGS. 1 and 2.

FIG. 6 is a flowchart 600 illustrating an example operational flow of implementations of FIGS. 1-5. In the example of FIG. 6, the operations are divided into flight operations 602, re-fly analysis operations 604, sorting operations 606, and final quality assurance/quality control operations 608. Further, as also illustrated, example operational implementations are illustrated as differentiating operations 610 performed by the pilot 106, operations 612 executed by the mobile flight application 130, and operations 614 that may be executed using the cloud server 114. Of course, FIG. 6 should be understood to represent illustrative, non-limiting example implementations, and as already described above with respect to the drone manager 102 of FIG. 1, the various operations of the flowchart 600 may be executed at any appropriate network location within the system of FIG. 1.

In the example of FIG. 6, the pilot 106 initially selects a generated flight plan (616), as generally described above with respect to FIG. 2. For example, in one option, the pilot 106 may execute a manual drone flight around the turbine being inspected (618). For example, as described above, the flight plan may designate an order or sequence of turbine blades and other components of the turbine to be inspected, and the pilot 106 may follow this type of static flight plan during the manual drone flight around the turbine.

In another example option, an automatic drone flight around the turbine to be inspected may be conducted (620). For example, the generated flight plan may be a dynamic flight plan based on GPS coordinates or other positional information, and the drone 104 may utilize telemetry data and/or sensor data to attempt to execute the automated flight plan around the turbine in question.

In either scenario, the drone 104 may utilize spatial awareness data from the various available sensors to calculate spatial awareness in real-time (622). Corresponding spatial awareness tags may then be imprinted onto image metadata for captured images (624). For example, such spatial awareness information may identify a particular turbine blade being inspected, or a side or other portion of each turbine blade.

Further at the mobile flight application 130, the tagged images may be inspected using a computer vision program to check for image quality factors (626). For example, the computer vision program may quantify or characterize levels of focus, contrast, or lighting within the captured, tagged images.

As described above, if errors are detected, a report on errors to re-fly may be generated (628). For example, such a re-fly report may be generated using a corresponding 3D model, such as the 3D model 502 of FIG. 5, to identify specific turbine areas to be re-inspected.

As with the original flight plan, in one option, the pilot 106 may execute a manual drone flight to specific areas of interest (630). In other example implementations, the drone flight to specific areas of interest may be automated (632).

Again, spatial awareness tags may be imprinted onto the image metadata of images captured during the re-fly process (634). As may be appreciated, the mapping of the images captured during the re-fly of the drone 104 may be mapped to the 3D model of the turbine in question, in order to ensure complete coverage of the turbine.

During sorting operations 606, files that may cause errors during the subsequent quality assurance/quality control analyses 608 may be removed (636). Available images may then be sorted into appropriate folders, (e.g., turbine, blade, and side folders), based on the included spatial awareness tags in relation to the 3D model (638).

The resulting folders may be inspected for any discrepancies to create a final QA/QC report (640). For example, if any folders are empty, or if there appears to be an uneven distribution in terms of number of images per folder, then quality errors may be reported.

The resulting report may be used by the pilot to decide on movement to a next turbine to be inspected, or to perform manual error handling as needed (642). For example, as necessary, the pilot 106 may execute a third deployment of the drone 104 around the turbine being inspected, in order to make a final capture of any required areas of the turbine.

Figure 7:
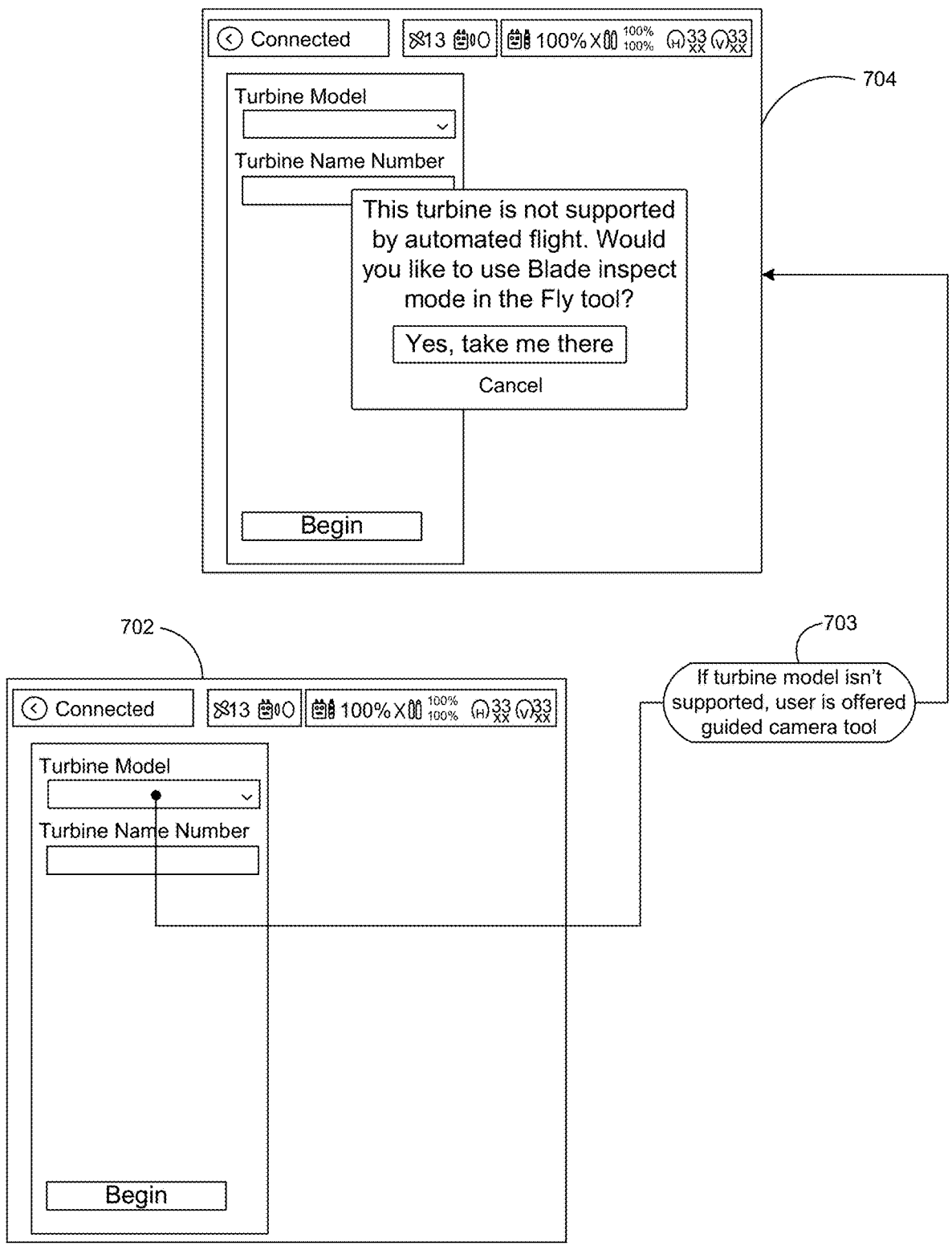
FIG. 7 is a fourth example screenshot used by the model-based damage analyzer of FIGS. 1 and 2.
Figure 8:
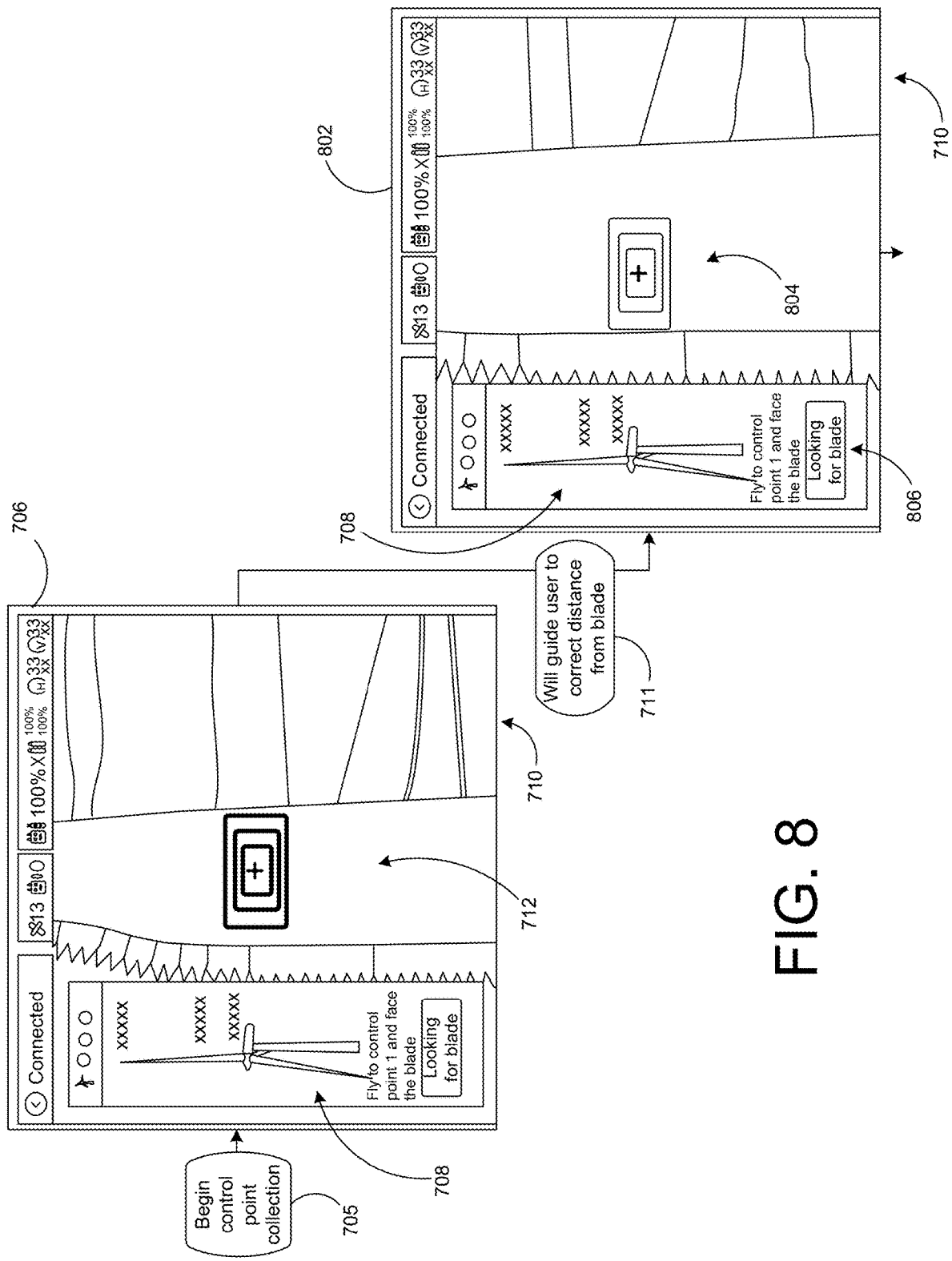
FIG. 8 is a fifth example screenshot used by the model-based damage analyzer of FIGS. 1 and 2.
Figure 9:
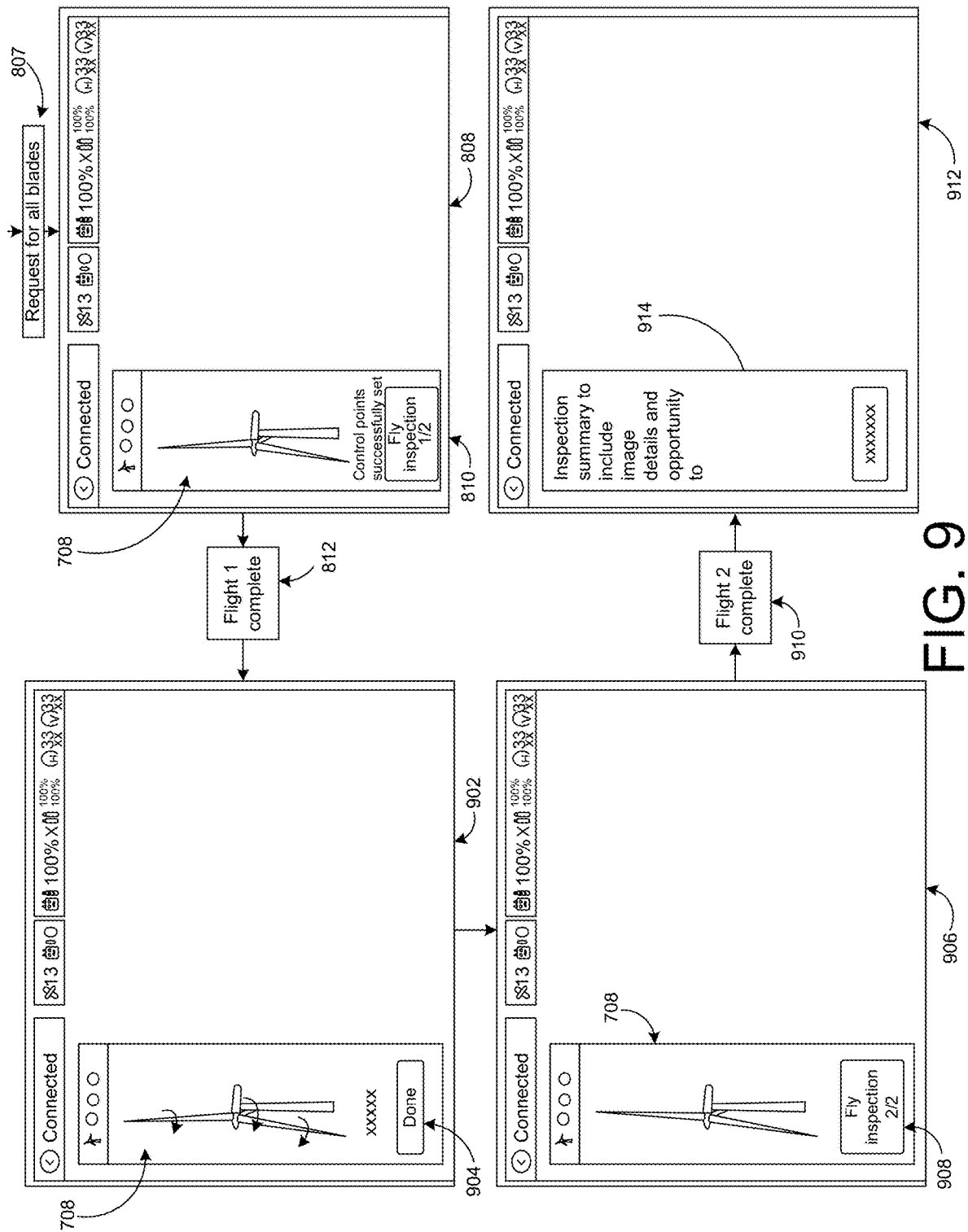
FIG. 9 is a sixth example screenshot used by the model-based damage analyzer of FIGS. 1 and 2.

FIGS. 7-9 are screenshots of example implementations of the flight controller 132 of the mobile flight application 130. In the example of FIG. 7, a screenshot 702 provides the pilot 106 with an ability to select a turbine model and/or turbine name/number that correspond to a turbine to be inspected. As shown in screenshot 704, if a turbine is not supported by the flight controller 132 for automated flight, then an option may be offered to the pilot 106 to fly the drone 104 in a manual blade inspection mode.

Otherwise, as shown in screenshot 706, the automated flight plan may proceed with a display element 708 illustrating the turbine to be inspected, including a control point at which to begin collection, and identified collection points along blades of the turbine in question. Further within the illustration 708, the pilot 106 may be instructed to fly to the first control point and face the drone toward the blade to be inspected. As the pilot 106 complies and flies the drone 104 to the identified control point, an image 710 may be provided with a visual indication of the control point 712.

Once the pilot is guided to a correct distance from the blade, then, as shown in screenshot 802 of FIG. 8, the indicator 712 of FIG. 7 may be updated to an indicator 804, informing the pilot that the correct distance has been established. Within the illustration 708, an indicator 806 may be rendered to indicate to the pilot 106 to execute a visual recording of the control point. In the example of FIGS. 7 & 8, the visual indicator 712 may be transformed into visual indicator 804 by, e.g., changing a color thereof, such as from red to green, to further visually indicate that image capture should proceed.

Further in FIG. 8, once the above process has been repeated for all blades of the turbine (807), screenshot 808 may be rendered to illustrate a screen that results once all control points have been set for a given turbine blade. When button "fly inspection ½" of portion 810 is selected, the drone 104 may proceed to take off and fly to the specified points to collect data automatically.

In FIG. 9, as shown in screenshot 902, the illustration 708 indicates that articulation of the turbine blades should be executed, after which completion of the articulation may be indicated through the use of the icon 904. Further in FIG. 9, elements 906-910 indicate a similar workflow as described above for FIG. 8. Specifically, upon setting of waypoints, the button to fly in portion 810 may be pressed. Then, following blade articulation, "done" button 904 may be pressed. Waypoints previously set using portion 810 may be set to enable selection of button 908 to fly.

Finally in FIG. 9, as the second flight is completed (910), a screenshot 912 indicates that an inspection summary may be generated that includes inspection summary 914, and image details and opportunities to re-fly, as needed, and as illustrated and described above with respect to FIGS. 1-6. Otherwise, as shown in screenshot 912, the pilot may proceed to save and exit from the current drone flight plan and inspection.

Figure 10:
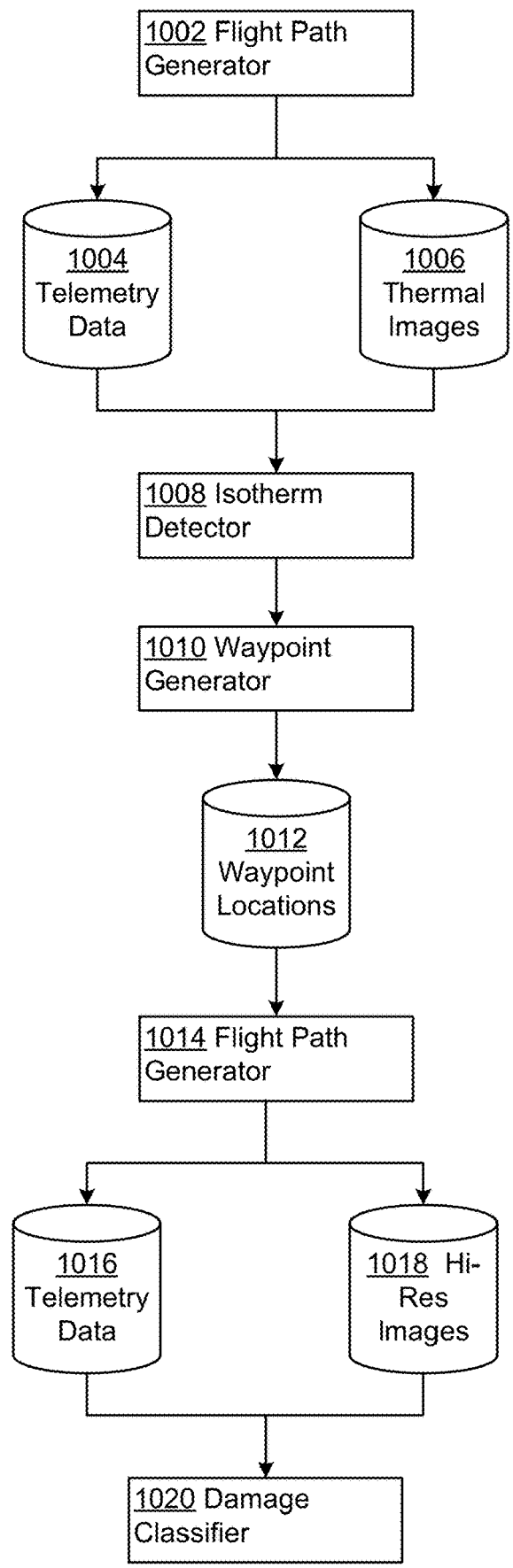
FIG. 10 is a block diagram of an example implementation of a thermal-based damage analyzer of FIG. 1.

FIG. 10 is a block diagram (and associated operational flow) of an example implementation of the thermal-based damage analyzer 140 of FIG. 1. In the example of FIG. 10, as described above with respect to FIG. 1, thermal tagging operations may be integrated into the mobile flight application 130, or otherwise within the drone manager 102. Thermal tagging may thus be executed during one or more flights of the drone 104, and may include directing the flight and other operations of the drone 104. Data captured during the one or more flights, including metadata directly related to the thermal tagging operations, may then be used in post-processing (e.g., at the cloud server 114) to provide a commercial product to be provided to an owner, operator, or administrator of the flight 110 and the equipment 115, in order to facilitate efficient operation of the equipment 115.

In the example of FIG. 10, the equipment 115 is assumed to include solar panels, e.g., a solar farm including a solar panel array. A flight path generator 1002 may be configured to receive relevant parameters, such as parameters characterizing available features of the drone 104 and the camera 121. The flight path generator 1002 may be further configured to receive boundary parameters of the solar farm at the site 110.

In the example of FIG. 10, and in contrast with many of the examples described above with respect to FIGS. 2-9, the flight path of the drone 104 generated by the flight path generator 1002 may be understood to include a 2D flight path at a defined altitude, and parameterized to ensure coverage of the entire solar panel array represented by the equipment 115 in FIG. 1.

As described above with respect to FIG. 1, the drone 104 may include multiple sensors. For example, the camera 121 may represent one or more different types of cameras. In the example of FIG. 10, the drone 104 is configured to include a camera or other sensor configured to detect infrared or other thermal data. For example, such a thermal sensor may capture an image in which each pixel or group of pixels may be associated with a heat level.

In example implementations of the system of FIG. 10, a solar farm at the flight 110 may cover hundreds of acres or more. Moreover, damage present at a particular solar panel within the array may be very small, such as a crack in the glass of a particular solar panel.

Further, external flight restrictions may be imposed on the pilot 106 that limit or prevent desired operations of the drone 104. For example, the drone 104 may be limited to a maximum altitude, e.g., a maximum altitude of 400 feet.

In the example of FIG. 10, the flight path generator 1002 may thus automatically generate a flight path or plan that ensures complete coverage of the solar panel array being inspected, while complying with all relevant, external flight restrictions. More specifically, the flight path generator 1002 may generate a first flight path at a relatively high (e.g., maximum allowable) altitude, for the purpose of capturing thermal imagery of an entirety of the solar panel array at the first, relatively high altitude.

Thus, in examples in which the drone 104 is limited to a maximum altitude of 400 feet, the pilot 106 may proceed to execute the generated flight path, either manually or automatically, at the first altitude. During the first flight, telemetry data 1004 and associated thermal images 1006 may thus be collected.

It will be appreciated that each thermal image of the thermal images 1006 captured at the relatively high altitude will cover or include a relatively large area of the solar panels, due to the wider field of view available at the relatively high altitude. Moreover, compared to the types of high resolution images described below, the thermal images 1006 may include less data, may generally be easier and faster to capture, store, and process than higher-resolution visual images.

An isotherm detector 1008 may be configured to analyze the thermal images 1006 and the telemetry data 1004 and identify any isotherm included therein. Specifically, as described herein, an isotherm refers generally to a heat threshold that may be predefined in conjunction with configuring the thermal-based damage analyzer 140.

In practice, many types of damage experienced by solar panels are associated with an increased heat signature at or near a site of the damage. For example, cracked glass or loose electrical connections may cause such increased localized heating.

A waypoint generator 1010 may be configured to receive the detected isotherms from the isotherm detector 1008, and further configured to generate and store one or more waypoint locations 1012 providing location coordinates for each identified isotherm. For example, although illustrated separately in FIG. 10 for the sake of illustration and explanation, it will be appreciated that, as described above with respect to FIG. 1, the telemetry data 1004 may be stored as metadata in conjunction with corresponding, individual thermal images of the thermal images 1006.

Thus, in example implementations, the isotherm detector 1008 may be configured to inspect each thermal image and its associated metadata to identify any isotherms included therein. Similarly, the waypoint generator 1010 may be configured to receive the identified isotherm and utilize the metadata of the relevant thermal image to generate a corresponding waypoint location of the waypoint locations 1012.

In various example implementations, the waypoint locations 1012 may be generated based on a position of the drone 104 at a time the corresponding thermal image was captured. For example, the waypoint locations 1012 may be calculated as GPS or other latitude/longitude characterizations of the drone 104 at the time of thermal image capture. Additionally, or alternatively, the position of the drone 104 may be characterized with respect to the solar panel array (e.g., using known boundaries of the array). In some implementations, the waypoint locations 1012 may be calculated and stored with respect to the solar panel array itself, rather than, or addition to, coordinates of the drone 104 at a time the thermal image in question was captured.

Using the waypoint locations 1012, the flight path generator 1014 may be configured to generate a second flight path for the drone 104. The flight path generator 1014 may be configured to operate similarly to the flight path generator 1002, but includes the waypoint locations 1012 as flight path parameters. Moreover, the flight path generator 1014 may be configured to generate the second flight path as occurring at a lower altitude than the relatively high altitude of the first flight path. As would be appreciated, the use of such a lower altitude may facilitate and enable capture of telemetry data 1016 and high resolution visual images 1018.

Using the telemetry data 1016 and the high resolution visual images 1018, a damage classifier 1020 may be configured to further identify, characterize, and otherwise classify the captured damage. For example, the damage classifier 1020 may be configured to utilize the telemetry data 1016 to create visualizations of polygons capturing and enclosing instances of damage.

More specifically, the damage classifier 1020 may be configured to construct shape file layers within, or associated with, each visual high resolution image. One of the shape file layers may include a polygon layer in which a polygon shape may be defined in any manner necessary to capture or enclose specific instance of damage. Thereafter, each damage instance may be identified with respect to its corresponding polygon.

Each polygon in the polygon layer may be stored in conjunction with its corresponding location and other damage characteristics. For example, such damage characteristics may include a temperature delta of the associated damage instance (e.g., an extent to which the corresponding isotherm was exceeded), a size of the damage instance, as well as a description of the location of the damage instance. In some implementations, location information for identified damage instances may be initially specified with respect to a corresponding drone position of the drone 104, and the damage classifier 1020 may be configured to convert relevant drone positions into corresponding solar panel locations.

In some implementations, the polygon layer constructed by the damage classifier 1020 may be generated as an image layer that includes an entire field of the relevant solar panel array. For example, the damage classifier 1020 may provide a visual image of the solar panel array with the calculated polygon layer superimposed thereon, so that a user may easily visually identify specific polygons and associated damage instances from the single image or other representation of the polygon layer with respect to the solar panel array. In other example implementations, individual polygons may be provided individually for review by a user.

As described herein with respect to various other example implementations, the damage classifier 1020 may also be configured to implement artificial intelligence or other types of machine-learning to classify individual damage instances. For example, a training set of known, pre-classified damage instances may be utilized to train a convolutional neural network to examine nearly-captured high resolution images 1018, to thereby classify individual damage instances within the high resolution images 1018 in accordance with the previously-defined types of damage.

For example, specific types of damage that may be classified may include individual cells that are reflecting, rather than absorbing, solar energy. Another type of damage includes wiring at a base of a solar panel that may overheat. An outage of individual or full strings of diodes may manifest as above-normal heat signatures. Physical damage to a solar panel, e.g., resulting in cracked glass, may also be classified.

In addition to the above and various other example types of damage that may be classified by the damage classifier 1020, use of a trained CNN or other neural network or AI may advantageously distinguish between actual damage, false positives, or false negatives. For example, the damager classifier 1020 may distinguish between actual damage instances and false positives, such as glare that may artificially increase a heat signature at a particular location of a solar panel, without representing actual damage thereto. Further, once trained, the damage classifier 1020 may be configured to examine an entirety of each image of high resolution images 1018, and not just the specific location of the potential damage instance identified by the described processes of the system of FIG. 10.

In addition to the various types of damage classification just referenced, the damage classifier 1020 may be configured to associate at each classified damage instance with a corresponding level of severity. For example, the damage classifier 1020 may assign a value on a predefined scale to indicate a relative severity of each classified damage instance.

Still further, although the damage classifier 1020 is shown in FIG. 10 to operate with respect to the high resolution images 1018 and the corresponding telemetry data 1016, it will be appreciated that similar damage classification may be executed at earlier points during the operations and processes of the system of FIG. 10. For example, the isotherm detector 1008 may be configured to implement and execute a preliminary type(s) of damage classification.

For example, the isotherm detector 1008 may execute damage classification for each detected isotherm. In this way, an initial, high level classification may be made as to whether a detected isotherm represents potential damage for which a corresponding waypoint should be generated. In such example implementations, it will be appreciated that, in general, fewer waypoints may be generated, so that a second, lower altitude flight path may be executed more quickly and easily.

Figure 11:
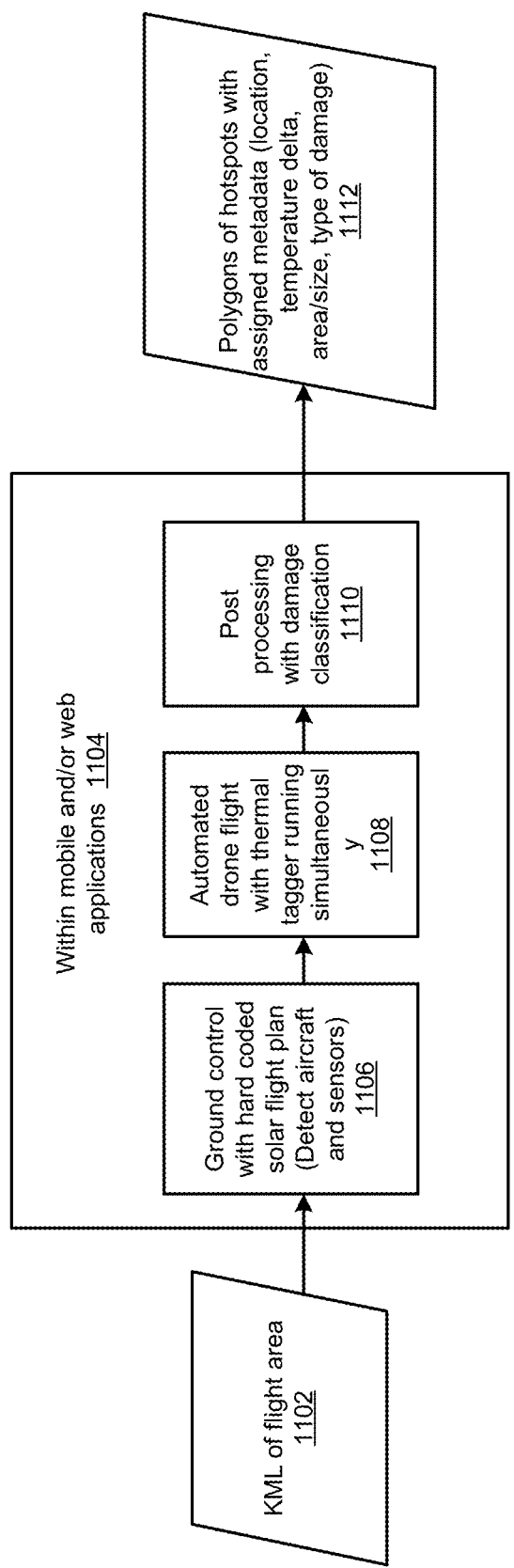
FIG. 11 is a block diagram illustrating a further example implementation of the thermal-based damage analyzer of FIGS. 1 and 10.

FIG. 11 is a flowchart illustrating a first example implementation of operations of the system of FIG. 10. In the example of FIG. 11, a KML of an identified flight area may be provided (1102), where a KML refers to file using keyhole markup language as a tag-based structure used to display geographic data in a browser. Of course, other file formats may be used, as well.

In other words, as illustrated within operations 1104, the KML of the flight area 1102 represents input parameters from which a hard coded solar flight plan may be generated (1106). As shown, operations 1104 may be executed within the mobile flight application 130, and/or at the cloud server 114. Specifically with respect to operation 1106, for example, the mobile flight application 130 may be configured to detect the relevant aircraft and available sensors.

Further in FIG. 11, an automated drone flight may be conducted (1108). For example, in the example of FIG. 10, the drone 104 is described as completing a first flight path at a first, higher altitude with thermal tagging operations being conducted simultaneously, and then completing a second, lower altitude flight to capture higher resolution visual images.

In other example implementations, however, the drone 104 may be deployed in a manner that intersperses the two flight paths in various manners. For example, the drone 104 may obtain thermal imagery for a defined portion of a solar panel array, and may then conduct the re-inspection of the same portion at the lower altitude used for obtaining high resolution visual images, and may then proceed to repeat this process for remaining portions of the solar panel array.

In some implementations, the drone 104 may detect an isotherm and thereafter immediately lower to the pre-defined lower altitude to be used for obtaining high resolution visual images. In general, it will be appreciated that it is not necessary for the drone 104 to land or otherwise complete a full inspection of a given solar panel array at the first, higher altitude, before commencing some or all of a flight path to be executed at the second, lower altitude.

Further in FIG. 11, post-processing with damage classification may be executed (1110). For example, as referenced above, a suitably-trained CNN may be used at the cloud server 14 to execute such damage classification.

Consequently, polygons of hotspots with assigned metadata may be generated (1112). For example, as referenced above, and shown in FIG. 11, a location, temperature delta, various/size, and type of damage may be generated and stored for each identified polygon.

Figure 12:
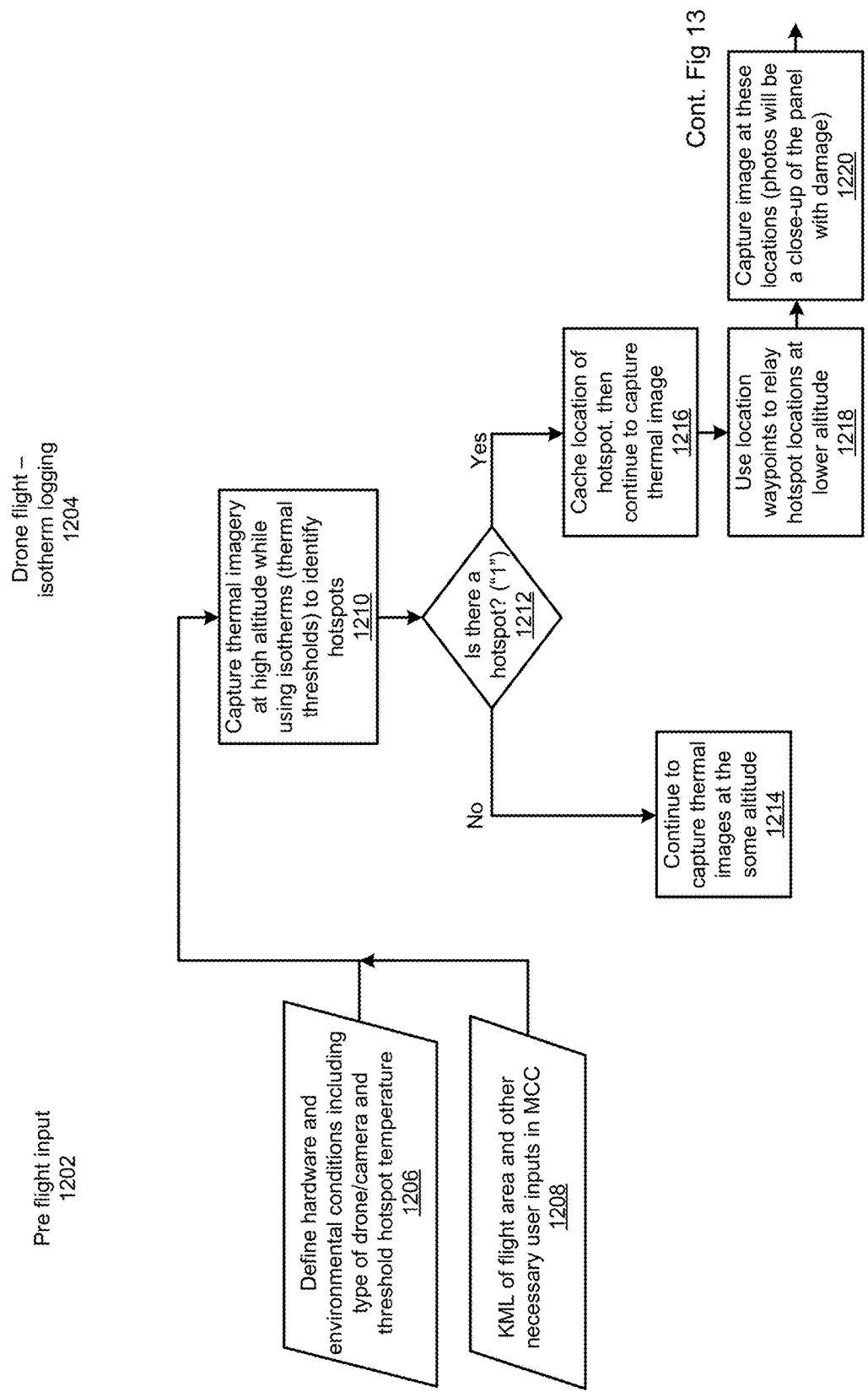
FIG. 12 is a first flowchart illustrating aspects of an example implementation of the thermal-based damage analyzer of FIGS. 1, 10, and 11.
Figure 13:
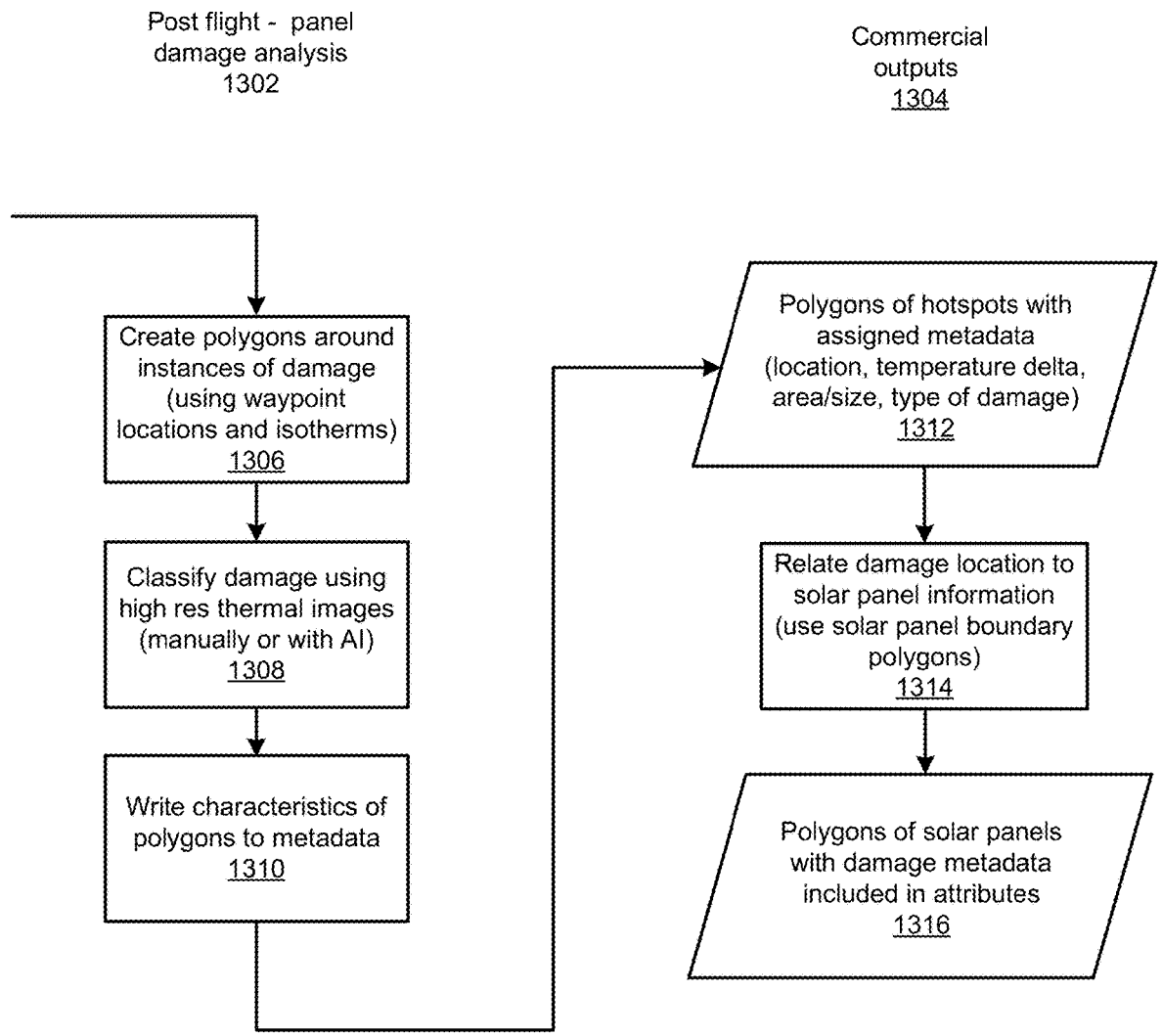
FIG. 13 is a second flowchart illustrating aspects of an example implementation of the thermal-based damage analyzer of FIGS. 1, 10, and 11.

FIG. 12 is a flowchart illustrating pre-flight input 1202 and a drone flight 1204 with isotherm logging. FIG. 13 is a flowchart showing continued operations of the flowchart of FIG. 12, illustrating post-flight panel damage analysis 1302 and subsequent output 1304.

In FIG. 12, the pre-flight input 1202 includes defined hardware and environmental conditions (1206). As illustrated, the hardware environmental conditions may include a type of drone and/or cameras that are available, as well as at least one threshold hotspot temperature (isotherm). Further, a KML of the relevant flight area and other necessary user inputs may be received (1208).

During the isotherm-logging drone flight 1204, thermal imagery is captured at high altitude while using isotherms to identify hotspots (1210). If there is no hotspot detected (1212), then the drone may continue along the generated flight path to capture thermal images of the same altitude (1214).

Otherwise (1212), if there is an identified hotspot, a location of the hotspot may be cached, while the drone continues the first flight path and associated capture of thermal images (1216). Identified location waypoints may then be used to re-fly hotspot locations at a lower altitude (1218). High resolution images (e.g., RGB images) may be captured at the identified locations (1220). For example, as described, the images may include high resolution, close-up images of the potentially damaged panel.

In FIG. 13, the post-flight panel damage analysis 1302 includes the definition and creation of polygons around instances of damage, using the previously-defined waypoint locations and isotherms (1306). For each polygon, damage may be classified using corresponding high resolution images, either manually and/or using a trained CNN (1308).

Resulting characteristics of each polygon may be written to corresponding metadata for each polygon (1310). For commercial outputs 1304 of FIG. 13, polygons of hotspots with the assigned metadata (1312) may be stored. A corresponding damage location for each polygon may be related to solar panel information (1314). For example, a solar panel array may be associated with solar panel boundary polygons, which may thus be correlated with the hotspot polygons to thereby illustrate and demonstrate relative locations of the damage instances.

Finally in FIG. 13, the polygons of solar panels with damage metadata included in corresponding attributes may be provided (1316). As a result, it will be appreciated that an owner or other administrator of the flight 110 including a solar panel array may be provided with an ability to easily identify, and thereby address, solar panel damage. Moreover, it will be appreciated that the pilot 106 is provided with an ability to capture and identify such damage in a highly fast and efficient manner, while minimizing or eliminating a need for the pilot 106 to return to the flight 110 on multiple occasions.

Figure 14:
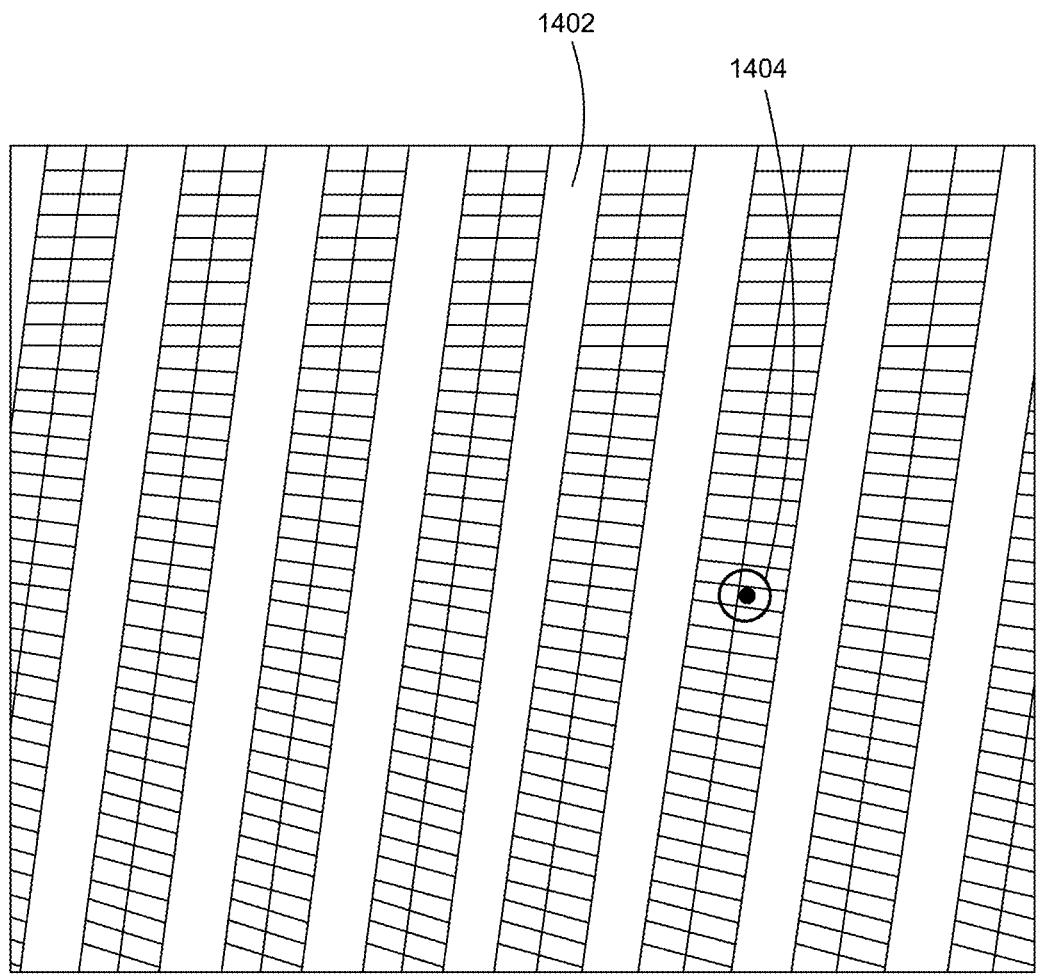
FIG. 14 is an illustration of a thermal image of a solar panel obtained during an example use of the thermal-based damage analyzer of FIGS. 1, 10, and 11.

FIG. 14 is a thermal image 1402 illustrating an example of the thermal images 1006 of FIG. 10. As shown, the thermal image 1402 illustrates a thermal image of a solar panel array. As further shown in FIG. 14, a hotspot 1404 illustrates a location on the solar panel of the thermal image 1402 on which a heat signature above a pre-defined isotherm has been detected.

Figure 15:
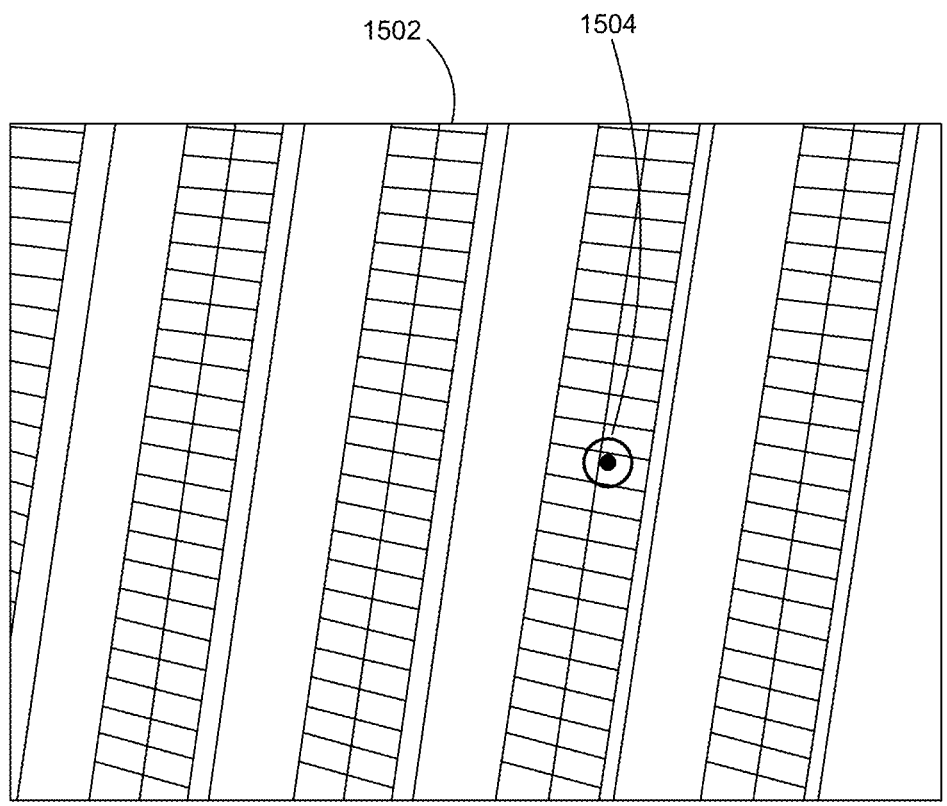
FIG. 15 is an illustration of a high-resolution image of the solar panel of FIG. 14.

FIG. 15 is a high resolution image 1502 illustrating an example of the high resolution images 1018 of FIG. 10. As may be appreciated from the above descriptions of FIGS. 1 and 10-13, the high resolution image 1502 represents a closer and more detailed image of the thermal image 1402 of FIG. 14, captured using a waypoint corresponding to the hotspot 1404 of FIG. 14.

Consequently, as also may be appreciated from the above description, further processing may be conducted using the high-resolution image 1502 of FIG. 15. Resulting damage classification enables fast, accurate, and efficient identification of solar panel damage, so that associated repair or replacement may be implemented. Moreover, the same or similar techniques may be used in other scenarios in which equipment to be inspected is dispersed or otherwise covers relatively large areas, and in which heat signatures may indicate areas of potential damage.

Figure 16:
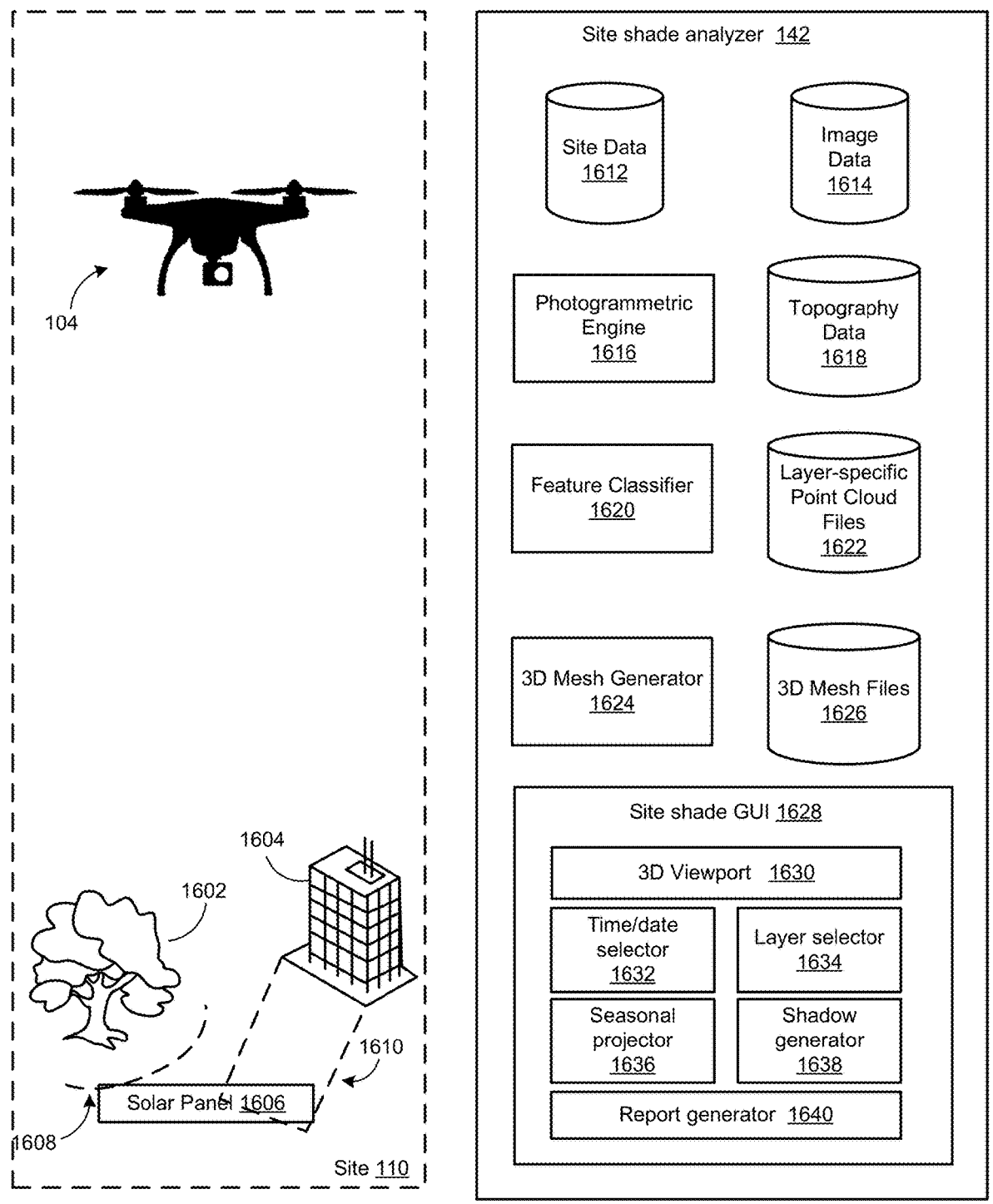
FIG. 16 is a block diagram of an example implementation of a site shade analyzer of FIG. 1.

FIG. 16 is a block diagram of an example implementation of the site shade analyzer 142 of FIG. 1. In the example of FIG. 16, for purposes of illustration and explanation of example features and functions of the site shade analyzer 142, the site 110 is illustrated as including a tree 1602 and a building 1604, positioned in the vicinity of a solar panel 1606. As also illustrated in FIG. 16, the tree 1602 may cast a shadow 1608, while the building 1604 may cast a shadow 1610. Of course, the shadows 1608 and 1610 will have relative sizes and positions that will change with a position of the sun throughout a given day, as well as with seasonal changes that may occur during the course of a given year. In the example of FIG. 16, the shadow 1608 may be cast during a morning of a given day, while the shadow 1610 may be cast at a later point in the same day, as the sun travels from east to west throughout the day.

Thus, at a given time, the solar panel 1606 may be partially or completely obscured from the sun by one or both of the shadows 1608, 1610. Such shading of the solar panel 1606 is highly undesirable, because a function and efficiency of the solar panel 1606 will be reduced, potentially substantially, in such scenarios.

It is apparent from FIG. 16 that elements 1602-1610 are not intended to be drawn to scale, nor to provide a comprehensive or complete illustration of the many various scenarios in which shadows may be present over periods of time at the site 110. Rather, the illustrated elements 1602-1610 should be understood to be representative of such scenarios, while providing points of reference for purposes of explanation and description of various example operations of the site shade analyzer 142.

As such, for example, the tree 1602 should be understood to represent virtually any flora, or foliage, or other natural elements that may grow at the site 110. Similarly, the building 1604 should be understood to represent, for example, virtually any man-made structure that may be present at the site 110. Further, it should be apparent from the above discussion of FIGS. 10-15 that the solar panel 1606 is representative of virtually any solar panel or solar panel array, including, but not limited to, the types of solar panel farms described above.

The site 110 in FIG. 16 may represent the various types of rural or remote sites primarily discussed above with respect to FIGS. 1-15. In such scenarios, structures represented by the building 1604 may not be present. On the other hand, it may occur that solar panels represented by the solar panel 1606 may also be installed in a more urban or suburban setting, in which case foliage represented by the tree 1602 may be of little or no concern for purposes of operation of the site shade analyzer 142. In many other scenarios, the solar panel 1606 may be installed, or potentially installed, in areas in which both foliage and structures must be considered for purposes of site shade analysis.

As referenced above with respect to FIG. 1, the site shade analyzer 142 provides a number of features and advantages. For example, it may occur that the site 110 initially does not include any solar panels represented by the solar panel 1606, and the site shade analyzer 142 is used for planning purposes, such as a selection of a best-available area for installing the solar panel 1606.

As described in detail below, such planning may include selecting an area(s) of the site 110 for installation of the solar panel 1606 that will avoid any shadow coverage of the solar panel 1606 being installed. In other examples, such installation planning may include taking corrective action to create or define an area in which the solar panel 1606 may be installed without being obscured by shadows. For example, such corrective actions may include trimming or removing foliage represented by the tree 1602.

In order to provide the above and other features and advantages, the site shade analyzer 142 is illustrated in FIG. 16 as including site data 1612 and image data 1614. Although illustrated separately in the example of FIG. 16 for purposes of description, it will be appreciated that at least some of the site data 1612 and image data 1614 may be stored together, including scenarios in which at least some of the site data 1612 is stored as metadata in conjunction with corresponding images.

The site data 1612 may include site data collected by the drone 104 using appropriate sensors and telemetry data. For example, the site data 1612 may include boundary or other positional information describing a current or potential future position of the solar panel 1606, as collected by the drone 104.

In other examples, the site data 1612 may also include site data that may be obtained independently of the drone 104. For example, the site data 1612 may include known latitude/ longitude information with respect to the site 110, or known boundary information defining a boundary of a solar farm that includes the solar panel 1606.

Meanwhile, the image data 1614 may include images captured by the drone 104 during one or more deployments of the drone 104. For example, the drone 104 may be deployed with a defined flight plan that includes predetermined factors such as a specific altitude, front image overlap, side image overlap, and drone speed.

In this context, 'overlap' refers to a percentage of an image that is shared by a neighboring image. Thus, 'frontlap' refers to the overlap an image has with the images in the same 'pass' or 'row' of the flight, while 'sidelap' refers to the overlap an image has in the images in the 'passes' or 'rows' next to that image/flight. For example, 70% frontlap for an image would indicate that 70% of the image is also visible in the next consecutive image.

Altitude impacts a spatial resolution of the imagery. For a given sensor, the higher the altitude being flown, the less detailed the imagery will be. As a result, higher altitude generally introduces relatively more uncertainty into a resulting topographical model.

Drone speed impacts both the duration of a flight and data quality. For example, the quicker an object appears to move across the drone's field of view, the faster the shutter speed must be in order to capture the subject without blur. Faster shutter speeds are associated with less time for light to saturate the sensor. Consequently, a shutter speed that is too fast may result in dark imagery and loss of detail, which may translate into undesirable results from the photogrammetry techniques described herein.

Specifically, a photogrammetric engine 1616 is configured to process the site data 1612 and the image data 1614, to thereby obtain topography data 1618. As described in more detail below, the photogrammetric engine 1616 is generally configured to utilize the 2D image data 1614, together with information from the site data 1612, including position(s) of the drone 104 when relevant images of the image data 1614 were captured, in order to generate 2.5 or 3D representations of the site 110 for storage as the topography data 1618.

For example, the topography data 1618 may specify a height of the tree 1602, or of the building 1604. More generally, the topography data 1618 may include images of the site 110 that include or specify X,Y coordinates, as well as elevation or other Z axis information characterizing the site 110.

In the examples described herein, the photogrammetric engine 1616 may be configured to generate the topography data 1618 as including one or more point clouds, e.g., in the .LAS format (LIDAR data exchange format). For example, the .LAS format is an industry-standard format for expressing point cloud data, which are collections of 3D data points in a defined space. In general, such point cloud files and formats are known to be useful for 3D modeling based on 2D images, and may be expressed and stored using a variety of techniques for encoding geographical information for computer storage (e.g., GIS files).

Moreover, it will be appreciated that the photogrammetric engine 1616 may be implemented using various techniques to generate the topography data 1618. For example, in addition to the various file types and formats just referenced, corresponding sensor(s), such as cameras and/or lidar sensors, may be used to generate the topography data 1618.

A feature classifier 1620 is configured to convert the topography data 1618 into layer-specific point cloud files 1622. For example, the feature classifier 1620 may be configured to classify layers corresponding to foliage, buildings, ground, and solar panels. Then, subsets of point cloud topography data from the topography data 1618 may be classified accordingly. As a result, for example, the layer-specific point cloud files 1622 may include point cloud files for a foliage layer, for a structure layer, for a ground layer, and for a solar panel layer.

In more detailed example implementations, the feature classifier 1620 may include a much larger number of layer types. For example, instead of a single foliage layer, the feature classifier 1620 may identify layer-specific point cloud files for multiple types of trees, or other foliage classifications. Similarly, different classifications may be made for different types of structures.

A 3D mesh generator 1624 may be configured to convert individual point cloud subsets from the layer-specific point cloud files 1622 into, e.g., 3D mesh or TIN (Triangulated Irregular Network) files, using a corresponding data conversion process. Further, image metadata may be utilized to determine, e.g., a location of the site 110, a date of imagery capture, or desired coordinate system projections, for providing a site shade graphical user interface (GUI) 1628.

Specifically, as illustrated in FIG. 16, and described and illustrated in further detail below with respect to FIG. 17, the site shade GUI 1628 may be configured to enable a user to provide the types of site shade analysis and planning described herein. For example, once 3D models of the 3D mesh files 1626 have been generated, the 3D files may be displayed using a 3D viewport 1630.

As the 3D viewport 1630 displays a desired or selected view of the site 110, a time/date selector 1632 may be utilized to specify a time of day and/or date of the year to be displayed within the 3D viewport 1630. Thus, by specifying a desired time of day, the user may be provided with corresponding shadow parameters for the specified time. Similarly, by specifying a date of the year, the 3D viewport 1630 may display a size, shape, and extent of the shadows 1608, 1610 on that date.

For example, the 3D viewport 1630 may display a size, shape, and extent of either of the shadows 1608, 1610 during a morning or evening of a specified date of the year. As described and illustrated below, the time/date selector 1632 may be implemented as a slider, in which case a user may move the slider over a range of dates/times in order to see corresponding, dynamic shadow coverage updates within the 3D viewport 1630 in real-time.

For example, as described in more detail below, the time/date selector 1632 may utilize the 3D mesh files 1626, along with corresponding site data 1612, to calculate and project shadow parameters. For example, the site data 1612 may include relevant solar data, such as an azimuth angle and elevation of the sun on each day of the year at the site 110.

Thus, it will be appreciated that the drone 104 may collect the site data 1612 and/or the image data 1614 on only one, two, or a few times/days. Nonetheless, the site shade analyzer 142 is configured to provide shadow parameters and associated shadow illustrations for any time of day, or any day of the year.

As a result, for example, a user planning an installation of the solar panel 1606 may execute the installation with confidence that the solar panel 1606 will not be obscured during any expected operating hours of the solar panel 1606, or during a later part of the year. Further, in conjunction with such installation, such a user may decide to take corrective action with respect to trimming or removing the tree 1602, if the shadow 1608 is determined to be problematic at any point in a calendar year.

A layer selector 1634 provides a user of the site shade GUI 1628 with an ability to selectively view individual layers, or types of layers, within the 3D mesh files 1626. For example, the use of the layer selector 1634 enables the 3D viewport 1630 to display only one or more desired layers of, e.g., available foliage, structure, ground, or solar panel layers.

For example, a user may utilize the layer selector 1634 to restrict the 3D viewport 1630 to illustrating only trees and solar panels. For example, for planning purposes, it may be difficult or impossible to make structural modifications to structures represented by the building 1604. Consequently, a user of the site shade GUI 1628 may wish to view only trees and other foliage that may reasonably be expected to be modified if needed for installation of the solar panel 1606.

A seasonal projector 1636 is configured to calculate and visualize seasonal changes that may occur with respect to foliage represented by the tree 1602. For example, if the tree 1602 is a deciduous tree, then a total volume and profile of the tree 1602 will be smaller during winter months, when leaves of the tree have fallen during the previous autumn, and will be larger during the summer months when all of the leaves of the tree 1602 have filled in.

As described herein, if the drone 104 collects image data 1614 during the winter, then the shadow 1608 calculated for a summer month (as selected by the time/date selector 1632) may be inaccurate. Thus, the seasonal projector 1636, when activated, enables more accurate calculations of shadows caused by foliage, for all seasons of the year, and even when image data is not available for the desired date/season.

In example implementations, the seasonal projector 1636 detects a layer within the 3D mesh files 1626 corresponding to trees/foliage. The seasonal projector 1636 may be configured to modify a 3D volume/profile of each object (e.g., tree) within the relevant layer.

In some example implementations, the seasonal projector 1636 may increase or decrease each such 3D volume/profile by a pre-determined percentage, depending on the relevant seasons. For example, as may be apparent from the above discussion, the seasonal projector 1636 may increase each 3D volume/profile by a defined percentage when the image data 1614 was captured during winter months, and requested shadow projections are specified with respect to a spring month, and by a larger percentage when the requested time/date is in a summer month.

In other examples, it may be possible to perform drone inspections at multiple times of the year, such as at two or more of the summer/winter solstice and/or the vernal/autumnal equinox. Then, seasonal projections may be made based on extrapolations/interpolations between data from these collection dates.

As described below with respect to FIG. 17, the seasonal projector 1636 may be selectively activated or deactivated by a user of the site shade GUI 1628, as needed. For example, when site foliage is primarily composed of coniferous trees, then seasonal changes may not be desired to be projected.

A shadow generator 1638 is configured to receive the relevant 3D mesh files 1626, as well as any relevant selections received by way of the time/date selector 1632, the layer selector 1634, and the seasonal projector 1636. Then, the shadow generator 1638 may be configured to calculate corresponding shadow boundaries and other shadow aspects, for display using the site shade GUI 1628. Further, generation of various types of reports characterizing the calculated shadows may be implemented, using a report generator 1640.

For example, the shadow generator 1638 may utilize relevant site data of the site data 1612, including a solar azimuth angle(s) and elevation(s), along with a latitude/longitude of the site 110. Appropriate trigonometric functions may be utilized and applied to the site data 1612 and the 3D mesh files 1626 to generate images of the shadows 1608, 1610.

Subsequent examples of reports that may be generated using the report generator 1640 are described below. For example, a report may include a shading map pdf, as a 2D representation of shading at the site 110 for the selected time/date. Other types of reports may include, e.g., a pdf of a solar radiation map, and various types of raw data files.

Figure 17:
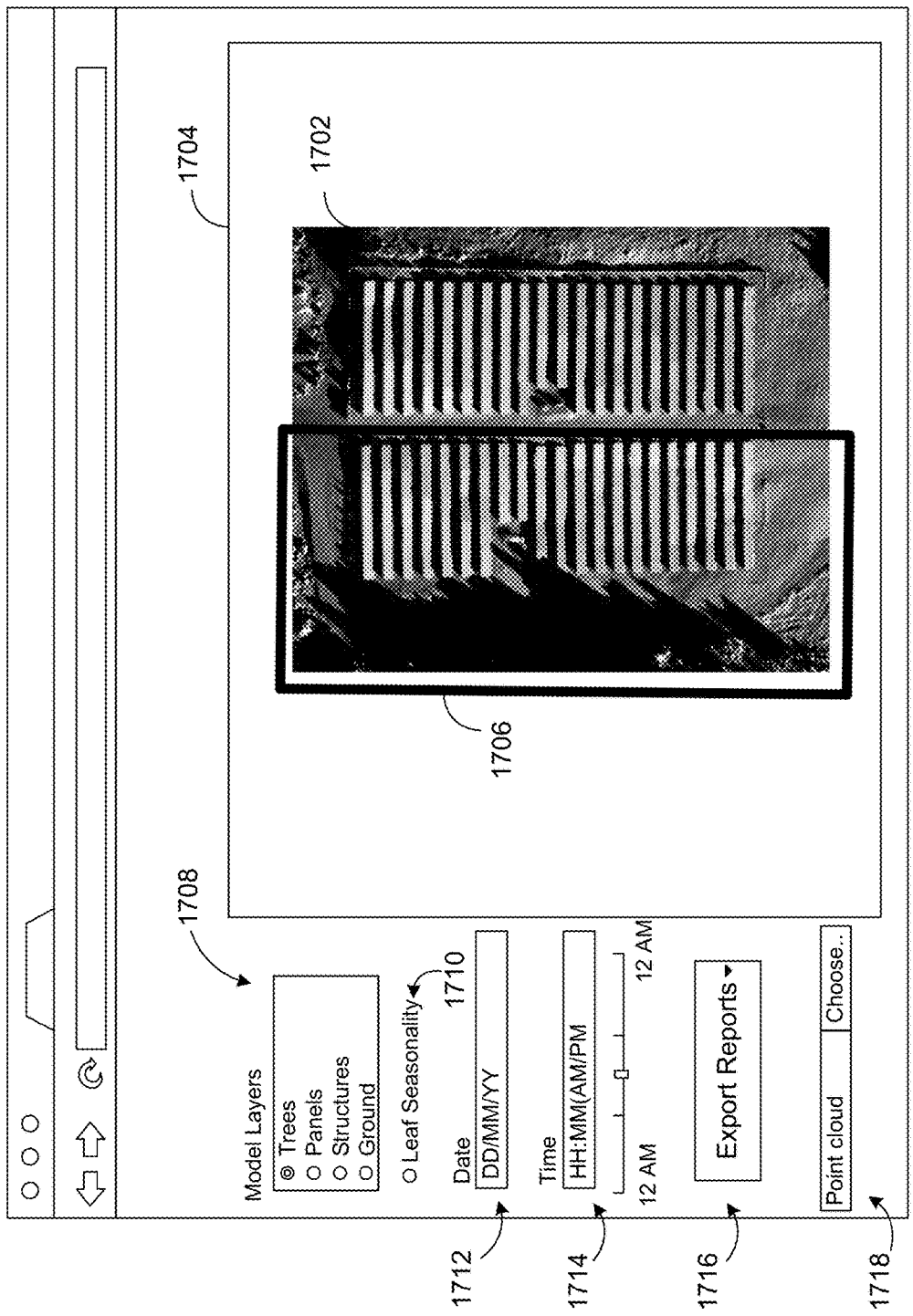
FIG. 17 is an example screenshot that may be used by the site shade analyzer of FIGS. 1 and 16.

FIG. 17 is a screenshot 1700 of an example implementation of the site shade GUI 1628 of FIG. 16. In the example of FIG. 17, a 3D representation 1702 of a (portion of a) site corresponding to the site 110 and including solar panels is illustrated within a 3D viewport 1704 corresponding to the 3D viewport 1630 of FIG. 16.

As described with respect to the shadows 1608 and 1610 of FIG. 16 with respect to the solar panel 1606, a user of the site shade GUI 1628 may desire to easily identify areas of overlap of shadows with the solar panel 1606. Consequently, in FIG. 17, a border 1706 is illustrated as visually highlighting or indicating an area in which a solar panel is at least partially obscured by a projected shadow.

Meanwhile, a selection box 1708 corresponds to the layer selector 1634 of FIG. 16. As shown, the selection box 1708 allows a user to select one or more model layers to be included for display within the 3D viewport 1704.

A leaf seasonality selector 1710 corresponds to the seasonal projector 1636 of FIG. 16. As described with respect to FIG. 16, a user may toggle the leaf seasonality selector 1710 on/off as desired, in order to include (or not include) seasonal leaf projections.

A date selector 1712 and time selector 1714 correspond to the time/date selector 1632 of FIG. 16. As illustrated, selectors 1712/1714 allow a user to easily specify any date for which shadow projections are desired, even when relevant image data has not actually been captured for the desired date.

A dropdown box 1716 may be included for a user to select a desired type of output report. Examples of output reports are described herein, e.g., with respect to FIG. 21.

A file upload widget 1718 enables a user to select 'Choose', and then browse for a point cloud file to upload to the site shade analysis platform. A selected point cloud file may then be fed into the processing box for point cloud classification and 3D mesh conversion, as described herein.

Figure 18:
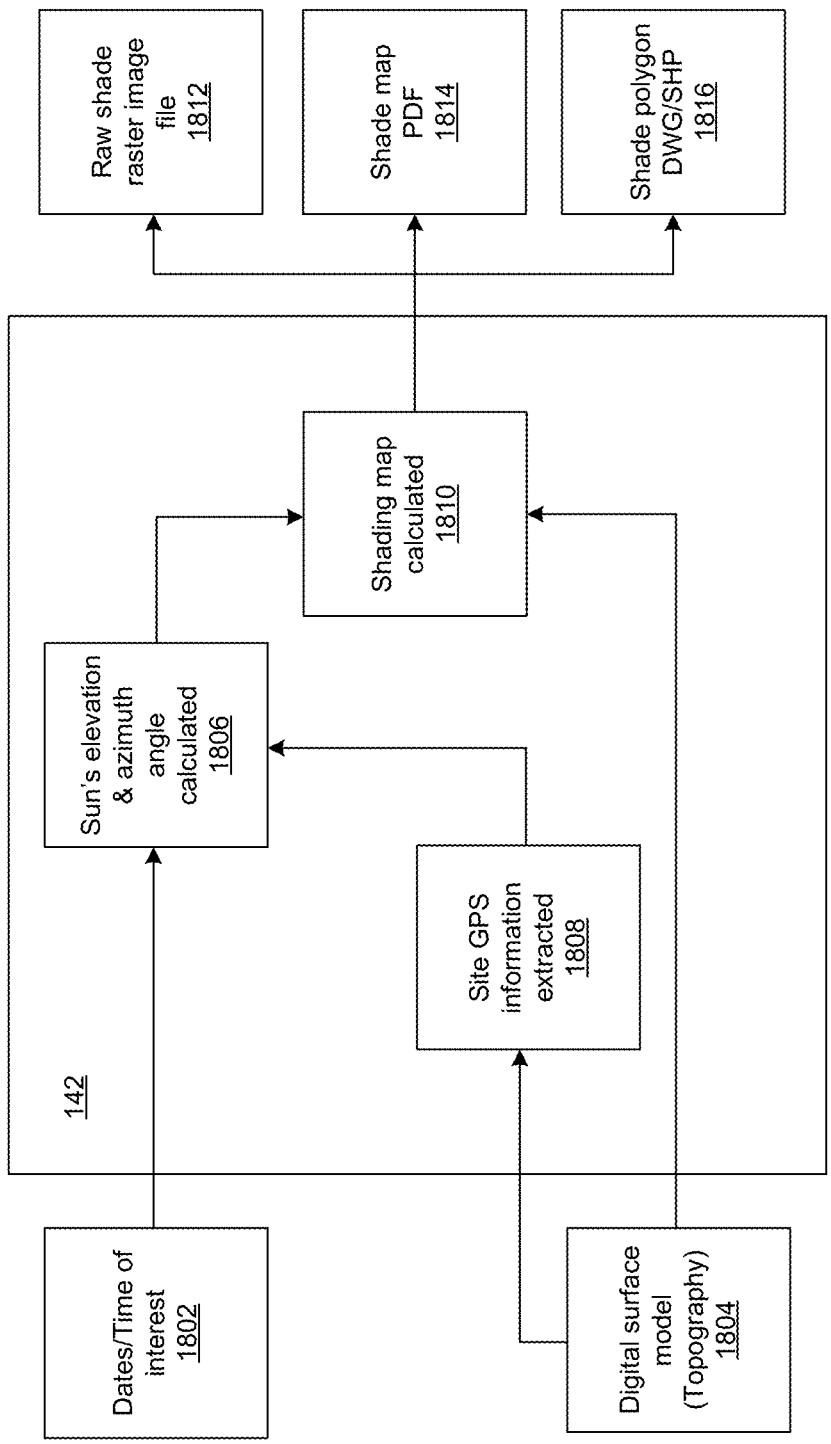
FIG. 18 is a block diagram of an example implementation of the site shade analyzer of FIGS. 1 and 16.

FIG. 18 is a block diagram illustrating an example implementation of the site shade analyzer 142 of FIGS. 1 and 16. In FIG. 18, relevant date/time of interest 1802 may be received. A digital surface model 1804 may also be received.

Site GPS information 1808 may be extracted from the digital surface model. A calculation 1806 of the suns' elevation and azimuth angle may be determined from the date/time of interest 1802, and the extracted site GPS information 1808.

Using the elevation/azimuth angle 1806 and the original digital surface model 1804, a shading map 1810 may be calculated. Then, various output reports 1812, 1814, 1816 may be generated. In the example of FIG. 18, a first example output report 1812 includes a raw shade raster image file, e.g., in a TIFF format. In example output report 1814, a shade map pdf is generated.

In a final example of FIG. 18, a shade polygon file 1816 is generated. The shade polygon file may be in, e.g., DWG or Shapefile (SHP) format(s), and contains the shape and georeferenced location for each shadow cast on solar panels at the selected time of day/year. The shade polygon file 1816 may be used, for example, to illustrate a full extent of the shade included therein, and to determine the source of the shade.

Of course, various other types of output reports may be generated, and more detailed discussion of such example output reports is provided below, with respect to FIG. 21.

Figure 19:
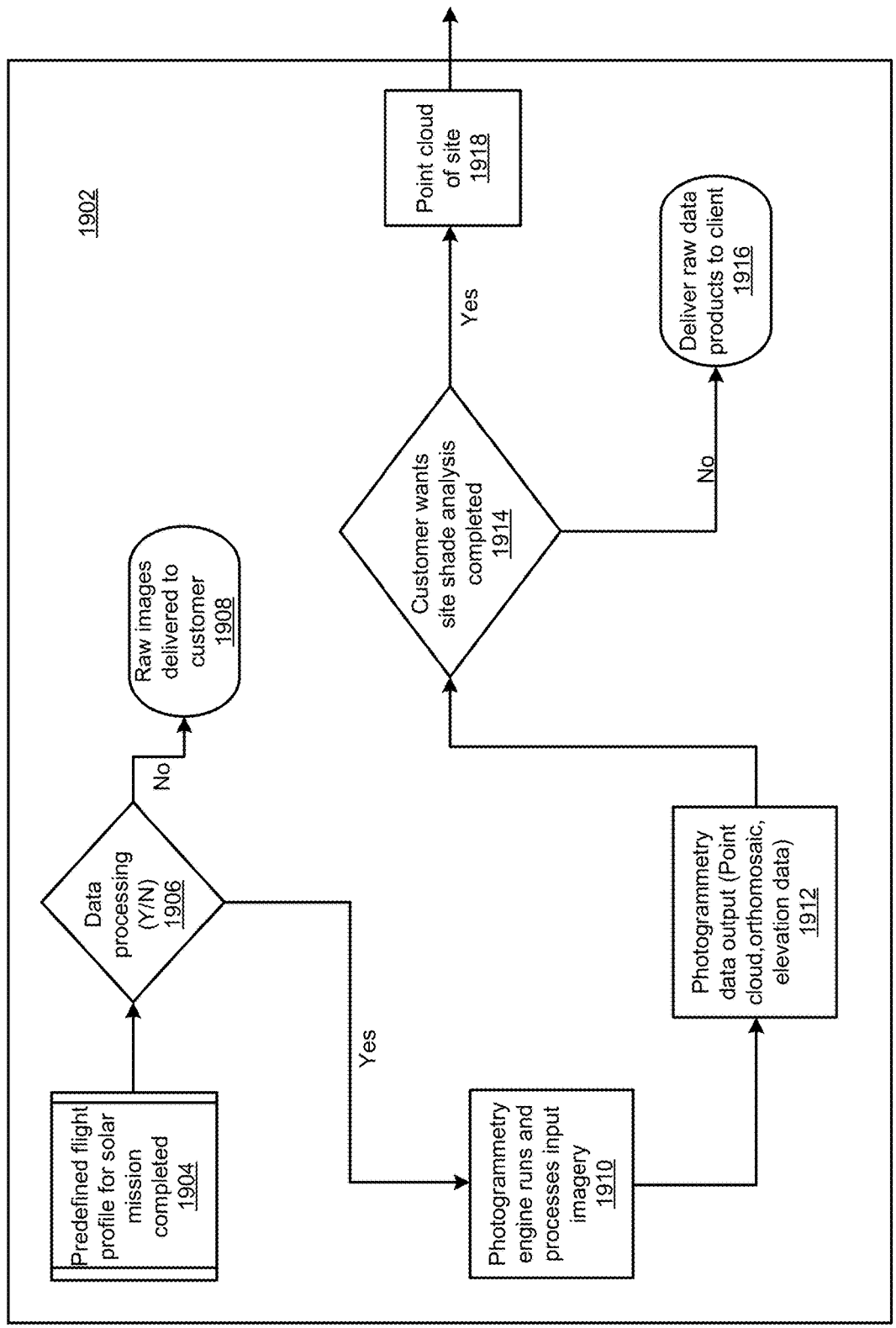
FIG. 19 is a flowchart illustrating receipt of example input parameters for initiating operations of the site shade analyzer of FIGS. 1 and 16.

FIG. 19 is a flowchart 1902 illustrating example operations associated with initiating site shade analysis using the system of FIG. 16. In the example of FIG. 19, a predefined flight profile for a solar panel mission is completed (1904). If a customer does not desire data processing (1906), then resulting raw images may be delivered to the customer (1908).

If data processing is desired (1906), a photogrammetry engine may be executed to process the input imagery (1910). Corresponding types of photogrammetry data may thus be output (1912). For example, as shown in FIG. 19, output photogrammetry data may include point cloud data, orthomozaic data, and/or elevation data.

If the customer does not want site shade analysis completed (1914), then raw data products corresponding to the photogrammetry data output may be delivered to the client (1916). Otherwise, a point cloud file of the relevant site may be generated (1918).

Figure 20:
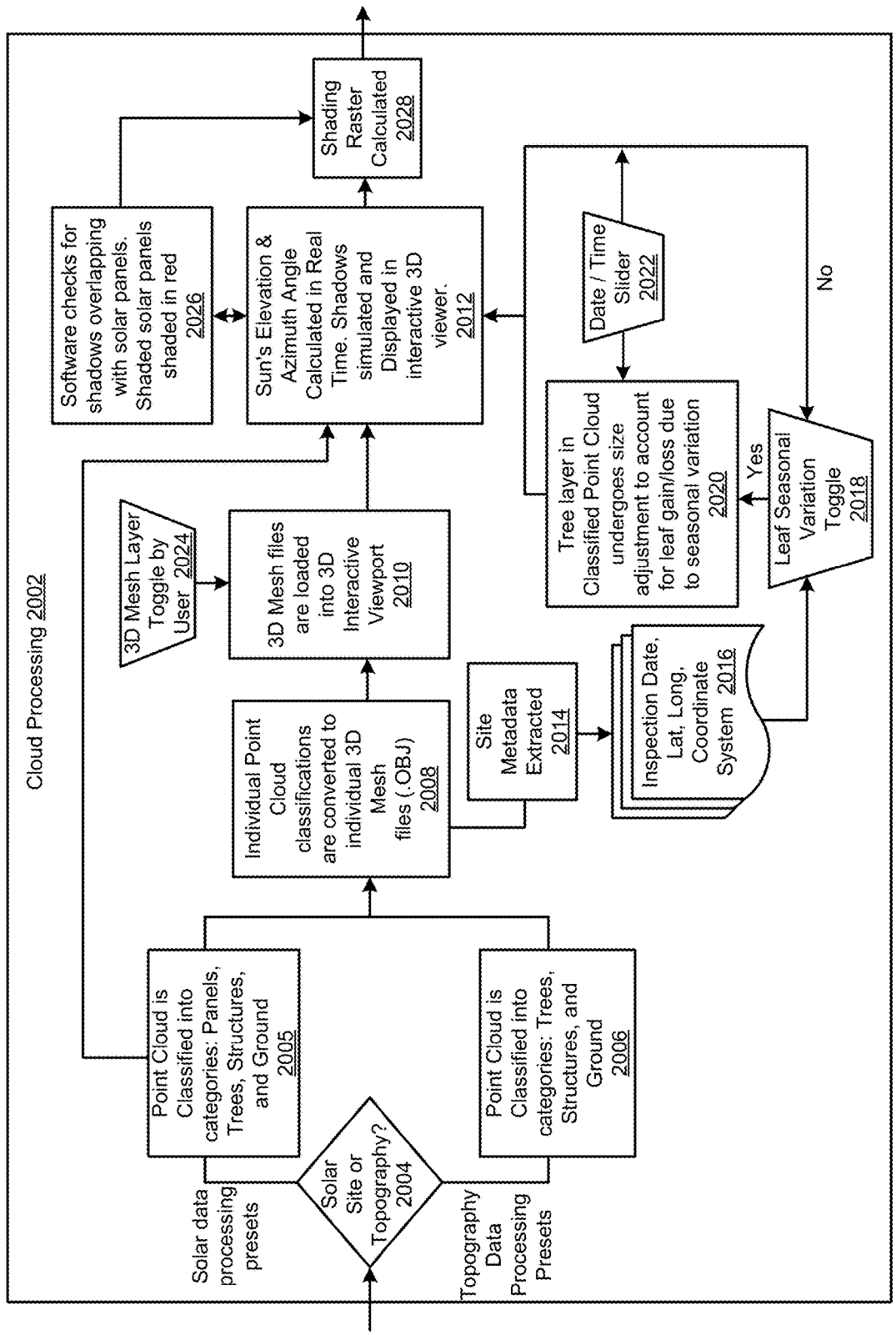
FIG. 20 is a flowchart illustrating example operations of the site shade analyzer of FIGS. 1 and 16.

FIG. 20 is a flowchart 2002 illustrating example site shade processing operations that may be executed. In the example of FIG. 20, the site shade processing operations may be executed, for example, at the cloud server 114 of FIG. 1.

In the example of FIG. 20, an initial determination is made as to whether the site being analyzed is a solar site (2004). Specifically, as referenced above, and described in detail below with respect to the remainder of FIG. 20, a site being analyzed that includes currently-installed solar panels may require additional processing to characterize a manner and extent to which any shadows may partially or completely obscure one or more of the solar panels. In other scenarios, in which solar panels are not yet installed at a site being analyzed, processing power and other resources may be conserved by not requiring such specialized operations. Put another way, in FIG. 20, 'topography processing' refers to conservation of processing resources obtained by not looking for (e.g., classifying) solar panels that are already known not to be present at the site in question.

Thus, in the example of FIG. 20, if the site is a solar site (2004), then solar data processing presets may be implemented to classify the previously-calculated point cloud data into categories that include solar panels, as well as trees, structures, and ground (2005).

If the site is not a solar site, and only topography analysis is required (2004), then standard topography data processing presets may be utilized to classify the point cloud into categories that include trees, structures, and ground (2006). Resulting individual point cloud classifications may be converted to individual 3D mesh files (2008). The resulting 3D mesh files may be loaded into a 3D interactive viewport for viewing (2010).

Site metadata may be extracted (2014) in order to determine an inspection date at which the site imagery was captured, a relevant latitude/longitude, and a coordinate system to be used (2016). If a leaf seasonal variation toggle has been selected (2018), then a tree layer and a classified point cloud may undergo size adjustments to account for leaf gain/loss due to seasonal variation (2020).

Whether or not the leaf seasonal variation toggle is selected, a date/time slider 2022 may be utilized to specify a desired date for which shadows are to be calculated. For example, as described above with respect to FIG. 17, a slider may be used to update calculated shadow projections in real-time, as the user slides the date/time slider along a given date range.

In some implementations, as described above, a 3D mesh layer toggle may be provided to the user (2024), so that the user may select one or more desired mesh layers to be loaded into the 3D interactive viewport (2010). For example, as described, the user may wish to view only shadows caused by trees, or only shadows caused by structures.

The sun's elevation and azimuth angle may be calculated in real-time, with shadows simulated and displayed in the interactive 3D view (2012). For scenarios with solar panels, shadows overlapping with solar panels may be detected and marked with a visual highlighting or other indicator (2026), as illustrated and described above with respect to FIG. 17.

Finally in FIG. 20, a shading raster may be calculated (2028). As referenced above and described in detail below with respect to FIG. 21, the calculated shading raster may be utilized in generating a number of different types of output reports.

In summary of FIGS. 16-20, a site shade GUI 1628/1700 enables a user to enter parameters to simulate the casting of shadows on the site 110 in real time. Based on the date and time entered by the user and the location of the site 110 derived from image metadata, a calculation may be executed to predict the sun's azimuth and elevation angles, giving the sun's position in the sky for the desired time. With a known light source, the 3D Mesh geometry may be used to simulate the shadows that would be cast on the site 110.

As also described and illustrated, a slider for time and/or date may be moved by the user, and the shadows will continuously be calculating and moving with it. If the site is a solar panel facility as specified by the user, the processing window may be configured to perform an overlap check between simulated shadows and solar panels. If a panel is shaded, it will be highlighted or otherwise indicated visually. Clicking on the highlighted panel will highlight the source of the shadow being cast thereon (e.g., a particular tree, or structure).

In described implementations, there is also a checkbox for 'Leaf Seasonality' that determines whether the simulation will alter a 'Trees' model layer to fit the user-entered Date. For example, users will be able to determine if they would like to run the analysis with a simulated tree/vegetation canopy coverage. In some implementations, by default, this option is unchecked (e.g., in case the site 110 does not have any tree cover, or in case the trees are coniferous). If this option is selected, a tree canopy 3D mesh will have its volume adjusted based on one or more algorithms designed to simulate a tree's canopy coverage and how it changes seasonally.

For example, if the site imagery was captured in January in the northern hemisphere and the trees are deciduous, the tree canopies would be smaller and less lush, resulting in shorter and smaller shadows. To more accurately simulate the shadows in the summer, volume may be procedurally added to the tree canopies, e.g., based on known seasonal canopy volume variations.

Figure 21:
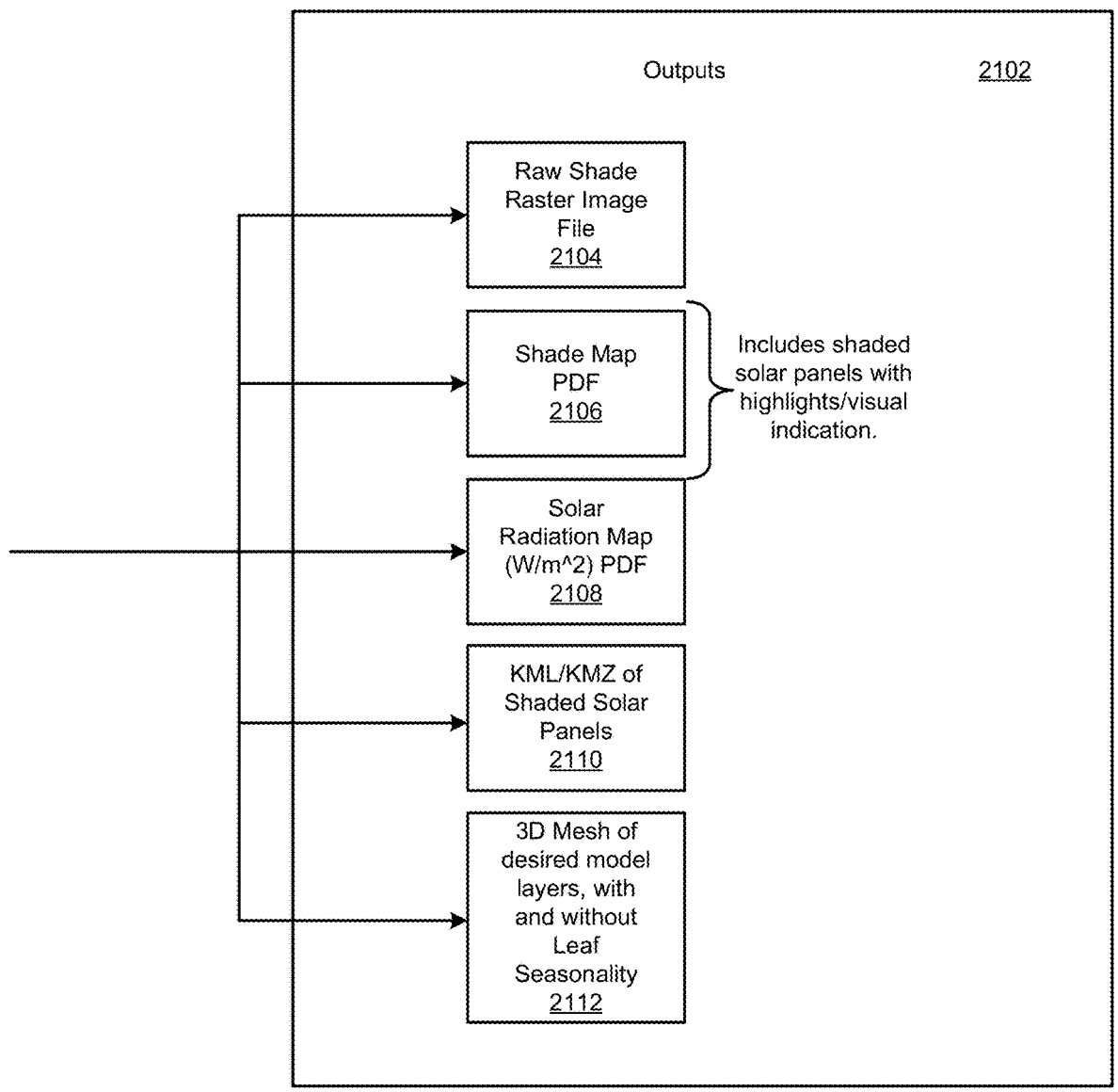
FIG. 21 illustrates example outputs of the site shade analyzer of FIGS. 1 and 16.

FIG. 21 illustrates various examples of the types of output reports that may be generated using the report generator 1640 of FIG. 16, and following, e.g., the processes of FIG. 20. Specifically, once a user is satisfied with specified, simulated shade conditions, an "Export Reports" dropdown 1716 in the GUI 1700. Resulting report(s) may be dependent on what is in the viewport. Unchecked model layers will generally not be visible in resulting report(s).

In some example implementations, the dropdown 1716 may contain one or more of the following reports 2102 in FIG. 21. Specifically, as referenced above, a raw shade raster image file 2104 may be included (e.g., a site shade raster in TIFF format).

Further, a shading Map PDF 2106 may include a 2D representation of the shading on site for the selected Date/Time. Map elements may indicate any user-selected options. If the site is a solar site, shaded solar panels may be highlighted. A table may accompany the report that details each instance of panel shading (e.g., by latitude/longitude), as well as a source of the shadow (e.g., by obstruction type and latitude/longitude).

A solar radiation map PDF 2108 represents a 2D Solar radiation map in $W/m^2$ (e.g., a PDF map as well as a TIFF file, with the TIFF being the source data displayed in the PDF). Such a tool may use the site's location and the simulated date to calculate the amount of solar radiation every square meter of the site, e.g., received in a 24 hr period.

A KML/KMZ of shaded solar panels 2110 represents a file containing (illustrating) shade-afflicted solar panels represented by georeferenced polygons. Such a file may be viewable in, e.g., compatible GIS/AutoCAD software or Google Earth.

In a final example output, a file 2112 represents a 3D mesh file of desired model layers. The desired model layers may or may not include leaf seasonality projections, as selected by a user and as described herein.

Figure 22:
FIG. 22 is an example point cloud illustration for an example site.
Figure 23:
FIG. 23 is an example 3D model corresponding to the example point cloud of FIG. 22.

FIG. 22 is an example point cloud illustration 2202 for an example site representing the site 110. A shadow 2204 is included and illustrated therein. FIG. 23 is an example 3D model corresponding to the example point cloud of FIG. 22.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
receive a set of images of a three-dimensional (3D) inspection object collected by a drone during execution of a first flight path;
receive telemetry data from the drone characterizing drone positions of the drone, during the execution of the first flight path;
generate a 3D model of the 3D inspection object, based on image data and telemetry data captured during execution of a modeling flight path executed prior to the execution of the first flight path;
store a tagged set of images, with each tagged image of the tagged set of images being stored together with a corresponding drone position at a corresponding time that the tagged image was captured, as obtained from the telemetry data;

execute a mapping of the set of tagged images to corresponding portions of the 3D model of the 3D inspection object, based on the telemetry data;

identify, based on the mapping, at least one portion of the 3D inspection object omitted from the set of tagged images; and generate a second flight path for the drone that specifies a position of the drone to capture an image of the at least one omitted portion of the 3D inspection object.

2. The computer program product of claim 1, wherein the instructions, when executed, are further configured to cause the at least one computing device to:

receive at least one image of the at least one omitted portion from the drone during the second flight path; and map the at least one image to the 3D model, based on telemetry data received from the drone at a time of capture of the at least one image of the at least one omitted portion.

3. The computer program product of claim 1, wherein the instructions, when executed, are further configured to cause the at least one computing device to:

execute the mapping including relating an image of the tagged set of images to a corresponding portion and surface area of the 3D model based on a field of view of a camera mounted on the drone and used to obtain the set of images, relative to a drone position at a time of image capture of the image.

4. The computer program product of claim 1, wherein the instructions, when executed, are further configured to cause the at least one computing device to:

filter the set of images based on image quality to remove at least one filtered image;

identify a filtered portion of the 3D inspection object, based on telemetry data from the drone at a time of capture of the at least one filtered image; and specify a position of the drone to capture an image of the filtered portion of the 3D inspection object during execution of the second flight path.

5. The computer program product of claim 1, wherein the instructions, when executed, are further configured to cause the at least one computing device to:

execute a trained convolutional neural network (CNN) to classify damage to the 3D inspection object within at least one image of the set of tagged images;

identify, based on the mapping and on the damage classification, at least one damaged portion of the 3D inspection object; and include, in the second flight path for the drone, a position of the drone to capture an image of the at least one damaged portion of the 3D inspection object.

6. The computer program product of claim 1, wherein the instructions, when executed, are further configured to cause the at least one computing device to:

generate a graphical user interface (GUI) configured to illustrate execution of the first flight path relative to the 3D inspection object, including illustrating completed portions and uncompleted portions of the first flight path, wherein the GUI is further configured to illustrate the at least one omitted portion during execution of the second flight path.

7. The computer program product of claim 1, wherein the instructions, when executed, are further configured to cause the at least one computing device to:

generate the second flight path including generating geospatial coordinates for the drone to be positioned to perform image capture of the at least one omitted portion.

8. The computer program product of claim 1, wherein the 3D inspection object includes a wind turbine having a plurality of turbine blades.

9. The computer program product of claim 8, wherein the instructions, when executed, are further configured to cause the at least one computing device to:

sort the set of tagged images and the image of the at least one omitted portion to correspond to each turbine blade of the plurality of turbine blades.

10. A computer-implemented method, the method comprising:

receiving a set of images of a three-dimensional (3D) inspection object collected by a drone during execution of a first flight path;

receiving telemetry data from the drone characterizing drone positions of the drone, during the execution of the first flight path;

storing a tagged set of images, with each tagged image of the tagged set of images being stored together with a corresponding drone position at a corresponding time that the tagged image was captured, as obtained from the telemetry data;

executing a mapping of the set of tagged images to corresponding portions of a 3D model of the 3D inspection object, based on the telemetry data;

identifying, based on the mapping, at least one portion of the 3D inspection object omitted from the set of tagged images;

generating a second flight path for the drone that specifies a position of the drone to capture an image of the at least one omitted portion of the 3D inspection object executing a trained convolutional neural network (CNN) to classify damage to the 3D inspection object within at least one image of the set of tagged images;

identifying, based on the mapping and on the damage classification, at least one damaged portion of the 3D inspection object and including, in the second flight path for the drone, a position of the drone to capture an image of the at least one damaged portion of the 3D inspection object.

11. The method of claim 10, further comprising:

executing the mapping including relating an image of the tagged set of images to a corresponding portion and surface area of the 3D model based on a field of view of a camera mounted on the drone and used to obtain the set of images, relative to a drone position at a time of image capture of the image.

12. The method of claim 10, further comprising:

filtering the set of images based on image quality to remove at least one filtered image;

identifying a filtered portion of the 3D inspection object, based on telemetry data from the drone at a time of capture of the at least one filtered image; and specifying a position of the drone to capture an image of the filtered portion of the 3D inspection object during execution of the second flight path.

13. The method of claim 10, further comprising:

generating the 3D model of the 3D inspection object, based on image data and telemetry data captured during execution of a modeling flight path executed prior to the execution of the first flight path.

14. The method of claim 10, further comprising:
generating a graphical user interface (GUI) configured to illustrate execution of the first flight path relative to the 3D inspection object, including illustrating completed portions and uncompleted portions of the first flight path,
wherein the GUI is further configured to illustrate the at least one omitted portion during execution of the second flight path.

15. The method of claim 10, further comprising:
generating the second flight path including generating geospatial coordinates for the drone to be positioned to perform image capture of the at least one omitted portion.

16. A system comprising:
at least one memory including instructions; and
at least one processor that is operably coupled to the at least one memory and that is arranged and configured to execute instructions that, when executed, cause the at least one processor to
receive a set of images of a three-dimensional (3D) inspection object collected by a drone during execution of a first flight path;
receive telemetry data from the drone characterizing drone positions of the drone, during the execution of the first flight path;
store a tagged set of images, with each tagged image of the tagged set of images being stored together with a corresponding drone position at a corresponding time that the tagged image was captured, as obtained from the telemetry data;
execute a mapping of the set of tagged images to corresponding portions of a 3D model of the 3D inspection object, based on the telemetry data, including relating an image of the tagged set of images to a corresponding portion and surface area of the 3D model based on a field of view of a camera mounted on the drone and used to obtain the set of images, relative to a drone position at a time of image capture of the image;
identify, based on the mapping, at least one portion of the 3D inspection object omitted from the set of tagged images; and
generate a second flight path for the drone that specifies a position of the drone to capture an image of the at least one omitted portion of the 3D inspection object.

17. The system of claim 16, wherein the system is further configured to:
generate a graphical user interface (GUI) configured to illustrate execution of the first flight path relative to the 3D inspection object, including illustrating completed portions and uncompleted portions of the first flight path,
wherein the GUI is further configured to illustrate the at least one omitted portion during execution of the second flight path.

* * * * *